United States Patent
Digiovanni et al.

(10) Patent No.: US 12,453,544 B2
(45) Date of Patent: Oct. 28, 2025

(54) SYSTEMS AND METHODS FOR ANKLE SYNDESMOSIS REPAIR

(71) Applicant: THE GENERAL HOSPITAL CORPORATION, Boston, MA (US)

(72) Inventors: Christopher W. Digiovanni, Waltham, MA (US); Ali Hosseini, Waltham, MA (US); Daniel Guss, Waltham, MA (US); Anne Holly Johnson, Boston, MA (US); George Alex, Boston, MA (US); Bart Lubberts, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 818 days.

(21) Appl. No.: 17/613,884

(22) PCT Filed: May 27, 2020

(86) PCT No.: PCT/US2020/034715
§ 371 (c)(1),
(2) Date: Nov. 23, 2021

(87) PCT Pub. No.: WO2020/243181
PCT Pub. Date: Dec. 3, 2020

(65) Prior Publication Data
US 2022/0218327 A1    Jul. 14, 2022

Related U.S. Application Data

(60) Provisional application No. 62/853,572, filed on May 28, 2019.

(51) Int. Cl.
*A61B 17/04* (2006.01)
*A61B 17/06* (2006.01)
(Continued)

(52) U.S. Cl.
CPC .......... *A61B 17/0401* (2013.01); *A61B 17/06* (2013.01); *A61B 17/06004* (2013.01);
(Continued)

(58) Field of Classification Search
CPC .............. A61B 17/8061; A61B 17/842; A61B 17/0401
See application file for complete search history.

(56) References Cited

U.S. PATENT DOCUMENTS

| | | | |
|---|---|---|---|
| 3,799,169 | A | 3/1974 | Beroff et al. |
| 5,055,105 | A | 10/1991 | Hamlin et al. |

(Continued)

FOREIGN PATENT DOCUMENTS

| WO | 2018118931 A1 | 6/2018 |
|---|---|---|
| WO | 2019035944 A1 | 2/2019 |

OTHER PUBLICATIONS

European Patent Office, Communication Pursuant to Rule 164(1) EPC and Partial Supplementary Search Report, Application No. 20813767.9, Jan. 3, 2023, 14 pages.
(Continued)

*Primary Examiner* — Olivia C Chang
(74) *Attorney, Agent, or Firm* — QUARLES & BRADY LLP

(57) ABSTRACT

An ankle syndesmosis repair system is designed to stabilize the ankle syndesmosis to allow for the repair of the ankle syndesmosis. The system provides multi-level, multi-directional stabilization of the ankle joint, while providing a sufficient amount of flexibility to the ankle joint. The system includes a suture advancing device, a fibula engaging arrangement, and a tibia engaging arrangement. The suture advancing device is configured to create a plurality of bone tunnels between the fibula engaging arrangement and the tibia engaging arrangement. The fibula engaging arrange-
(Continued)

ment and the tibia engaging arrangement are each configured to receive and secure a plurality of lengths of suture when implanted on the ankle syndesmosis. The plurality of lengths of suture are provided at differing longitudinal and transverse locations relative to the fibula and tibia. The plurality of lengths of suture are also angled with respect to each other.

9 Claims, 17 Drawing Sheets

(51) Int. Cl.
| | |
|---|---|
| A61B 17/68 | (2006.01) |
| A61B 17/80 | (2006.01) |
| A61B 17/84 | (2006.01) |
| A61B 17/88 | (2006.01) |

(52) U.S. Cl.
CPC ........ *A61B 17/683* (2013.01); *A61B 17/8061* (2013.01); *A61B 17/842* (2013.01); *A61B 17/8866* (2013.01); *A61B 2017/0404* (2013.01); *A61B 2017/0417* (2013.01)

(56) References Cited

U.S. PATENT DOCUMENTS

| | | | |
|---|---|---|---|
| 9,179,950 | B2 | 11/2015 | Zajac et al. |
| 9,204,874 | B2 | 12/2015 | Denove et al. |
| 9,226,743 | B2 | 1/2016 | Dreyfuss et al. |
| 9,277,912 | B2 | 3/2016 | Donate et al. |
| 2010/0152752 | A1 | 6/2010 | Denove et al. |
| 2013/0030480 | A1 | 1/2013 | Donate et al. |
| 2016/0008041 | A1 | 1/2016 | Makhlouf |
| 2016/0030035 | A1 | 2/2016 | Zajac et al. |
| 2017/0209140 | A1 | 7/2017 | Thornes |
| 2018/0153601 | A1 | 6/2018 | Riley et al. |
| 2018/0221133 | A1 | 8/2018 | Lund |
| 2018/0318097 | A1* | 11/2018 | Armacost .......... A61B 17/0401 |
| 2022/0142635 | A1* | 5/2022 | Bachmaier ......... A61B 17/0401 |

OTHER PUBLICATIONS

PCT/US2020/034715—International Search Report and Written Opinion—Sep. 30, 2020.
Arthrex RightRope Syndesmosis Fixation Surgical Technique. 2012.

\* cited by examiner

SYSTEMS AND METHODS FOR ANKLE SYNDESMOSIS REPAIR

CROSS REFERENCE TO RELATED APPLICATIONS

This application is a U.S. National Stage of PCT Application No. PCT/US2020/034715 filed on May 27, 2020 which is based on, claims benefit of, and claims priority to U.S. Provisional Application No. 62/853,572 filed on May 28, 2019, which are hereby incorporated by reference herein in their entirety for all purposes.

STATEMENT REGARDING FEDERALLY SPONSORED RESEARCH

Not Applicable.

BACKGROUND OF THE INVENTION

1. Field of the Invention

The invention relates to systems and methods for the stabilization and repair of an ankle syndesmosis. More particularly, the invention relates to systems and methods for multi-level, multi-directional stabilization of the ankle syndesmosis.

2. Description of the Related Art

There is a high prevalence of ankle injuries both in athletic and non-athletic populations. The ankle joint is formed by three bones coming together in a syndesmotic relationship: the tibia, the fibula, and the talus. Post-injury, the ankle syndesmosis may be stabilized through surgery to allow for the repair of the joint. However, traditional methods have yielded various drawbacks. Specifically, some methods, such as bone-screw stabilization, have been shown to effectively stabilize the ankle syndesmosis, but do not provide a natural amount of flexibility of the ankle joint. Other methods, such as traditional suture-button stabilization have conversely allowed for too much flexibility of the joint, diminishing the stabilization effects, and reducing efficacy of the repair of the ankle syndesmosis.

Therefore, there is a need for improved systems and methods for ankle syndesmosis repair.

SUMMARY OF THE INVENTION

The present invention provides a dramatic improvement to current ankle syndesmosis repair techniques. This invention is designed to achieve multi-level, multi-directional stabilization of the ankle syndesmosis, while effectively reducing play in the stabilization system. Further, a specialized clamp for fixing the fibula and the tibia relative to each other during the implantation of the ankle syndesmosis repair system allows for the effective creation of multi-level, multi-directional bone tunnels, through which various lengths of suture may be used to stabilize the ankle joint.

In one aspect, the present disclosure provides an ankle syndesmosis repair system comprising a first length of suture, a second length of suture, a suture advancing device, a fibula engaging arrangement, and a tibia engaging arrangement. The suture advancing device comprises an elongated shaft having a distal end and a proximal end, wherein the distal end terminates in a pointed tip, and the proximal end is dimensioned to individually receive the first length of suture and the second length of suture. The fibula engaging arrangement is dimensioned to engage a lateral surface of the fibula. The fibula engaging arrangement has a first through hole dimensioned to receive the first length of suture and a second through hole dimensioned to receive the second length of suture. The tibia engaging arrangement is dimensioned to engage a medial surface of the tibia. The tibia engaging arrangement has a first passageway dimensioned to receive the first length of suture and a second passageway dimensioned to receive the second length of suture. At least one of the fibula engaging arrangement and the tibia engaging arrangement is configured such that the first length of suture and the second length of suture are at an oblique angle in an axial view of the fibula or the tibia when the first length of suture, the second length of suture, the fibula engaging arrangement, and the tibia engaging arrangement are implanted in the ankle.

In some embodiments, the ankle syndesmosis repair system can further include a third length of suture, wherein the proximal end of the suture advancing device can be dimensioned to individually receive the third length of suture and the fibula engaging arrangement can have a third through hole dimensioned to receive the third length of suture. The tibia engaging arrangement can have a third passageway dimensioned to receive the third length of suture and at least one of the fibula engaging arrangement and the tibia engaging arrangement can be configured such that the first length of suture and the third length of suture are at an oblique angle in the axial view of the fibula or the tibia when the first length of suture, the second length of suture, the third length of suture, the fibula engaging arrangement, and the tibia engaging arrangement are implanted in the ankle.

In some embodiments, the fibula engaging arrangement can include a fibula bone plate having the first through hole and the second through hole, the first through hole and the second through hole can be dimensioned such that the suture advancing device can pass through the first through hole and the second through hole. The first through hole can have a first longitudinal axis, the second through hole can have a second longitudinal axis, and the first longitudinal axis and the second longitudinal axis can be angled with respect to each other such that the suture advancing device is guided along a first path when passing through the first through hole and the suture advancing device is guided along a second path when passing through the second through hole, the first path and the second path being at an oblique angle in the axial view of the fibula or the tibia.

In some embodiments, the first through hole and the second through hole can be axially spaced in relation to a longitudinal axis of the fibula bone plate. The first through hole and the second through hole can be transversely spaced in relation to the longitudinal axis of the fibula bone plate. The fibula bone plate can have a third through hole located between the first through hole and the second through hole. The fibula bone plate can have a concave inner surface to conform to a surface of the fibula. The fibula engaging arrangement can include (i) a first fibula button having the first through hole and a first additional through hole, and (ii) a second fibula button having the second through hole and a second additional through hole.

In some embodiments, the suture advancing device can have a longitudinal length exceeding a transverse distance from the anteromedial surface of the tibia to the posterolateral surface of the fibula at a distal tibiofibular joint such that the suture advancing device can form a bone tunnel extending from the anteromedial surface of the tibia to the posterolateral surface of the fibula when the suture advancing device is moved through the tibia and the fibula at the distal tibiofibular joint. At least one of the first fibula button and the second fibula button can be dimensioned such that the at least one of the first fibula button and the second fibula button cannot pass through the bone tunnel.

In some embodiments, at least one of the first fibula button and the second fibula button can have a concave inner surface to conform to a surface of the fibula. The tibia engaging arrangement can include a tibia bone plate having the first passageway and the second passageway. The first passageway and the second passageway can be dimensioned such that the suture advancing device can pass through the first passageway and the second passageway. The first passageway can include a first longitudinal axis and the second passageway can include a second longitudinal axis. The first longitudinal axis and the second longitudinal axis can be angled with respect to each other such that the suture advancing device is guided along a first path when passing through the first passageway and the suture advancing device is guided along a second path when passing through the second passageway, the first path and the second path being at an oblique angle in the axial view of the fibula or the tibia.

In some embodiments, the first passageway and the second passageway can be axially spaced in relation to a longitudinal axis of the tibia bone plate. The first passageway and the second passageway can be transversely spaced in relation to the longitudinal axis of the tibia bone plate. The tibia bone plate can include a third passageway located between the first passageway and the second passageway. The tibia bone plate can have a concave inner surface to conform to a surface of the tibia. The tibia engaging arrangement can include (i) a first tibia button having the first passageway and a first additional passageway, and (ii) a second tibia button having the second passageway and a second additional passageway.

In some embodiments, the suture advancing device can have a longitudinal length exceeding a transverse distance from the anteromedial surface of the tibia to the posterolateral surface of the fibula at a distal tibiofibular joint such that the suture advancing device can form a bone tunnel extending from the anteromedial surface of the tibia to the posterolateral surface of the fibula when the suture advancing device is moved through the tibia and the fibula at the distal tibiofibular joint. At least one of the first tibia button and the second tibia button can be dimensioned such that the at least one of the first tibia button and the second tibia button cannot pass through the bone tunnel.

In some embodiments, at least one of the first tibia button and the second tibia button can have a concave inner surface to conform to a surface of the tibia. The elongated shaft of the suture advancing device can be cylindrical and have a diameter in a range of 0.5 to 2.5 millimeters.

In some embodiments, the ankle syndesmosis repair system can further include a third length of suture. The proximal end of the suture advancing device can be dimensioned to individually receive the third length of suture. The fibula engaging arrangement can include a fibula bone plate having the first through hole and the second through hole and a third through hole. The first through hole and the second through hole and the third through hole can be dimensioned such that the suture advancing device can pass through the first through hole and the second through hole and the third through hole. The first through hole can have a first longitudinal axis, the second through hole can have a second longitudinal axis, and the third through hole can have a third longitudinal axis. The first longitudinal axis and the second longitudinal axis can be angled with respect to each other such that the suture advancing device is guided along a first path when passing through the first through hole and the suture advancing device is guided along a second path when passing through the second through hole, the first path and the second path being at an oblique angle in the axial view of the fibula or the tibia. The tibia engaging arrangement can include (i) a first tibia button having the first passageway and a first additional passageway, (ii) a second tibia button having the second passageway and a second additional passageway and (iii) a third tibia button having a third passageway and a third additional passageway.

In another aspect, the present disclosure provides a method for performing ankle syndesmosis fixation. The method includes the steps of: (a) moving a suture advancing device comprising an elongated shaft having a distal end terminating in a pointed tip and a proximal end through a fibula and a tibia of a distal tibiofibular joint until the proximal end of the elongated shaft is adjacent an outer surface of the fibula or the tibia, wherein the proximal end receives a first length of suture; (b) securing a first section of the first length of suture to one of a fibula engaging arrangement and a tibia engaging arrangement; and (c) securing a second section of the first length of suture to the other of the fibula engaging arrangement and the tibia engaging arrangement.

In some embodiments, the method can further include the steps of: (d) moving the suture advancing device through the fibula and the tibia of the distal tibiofibular joint until the proximal end of the elongated shaft is adjacent an outer surface of the fibula or the tibia, the proximal end receiving a second length of suture; (e) securing a first section of the second length of suture to one of the fibula engaging arrangement and the tibia engaging arrangement; and (f) securing a second section of the second length of suture to the other of the fibula engaging arrangement and the tibia engaging arrangement. The second length of suture can be at an oblique angle with respect to the first length of suture in the axial view of the fibula or the tibia.

In some embodiments, the method can further include the steps of: (g) moving the suture advancing device through the fibula and the tibia of the distal tibiofibular joint until the proximal end of the elongated shaft is adjacent an outer surface of the fibula or the tibia, the proximal end receiving a third length of suture; (h) securing a first section of the third length of suture to one of the fibula engaging arrangement and the tibia engaging arrangement; and (i) securing a second section of the third length of suture to the other of the fibula engaging arrangement and the tibia engaging arrangement. The third length of suture can be at an oblique angle with respect to the first length of suture or the second length of suture in the axial view of the fibula or the tibia.

In some embodiments, the fibula engaging arrangement can include a fibula bone plate having a first through hole and a second through hole. The first through hole and the second through hole can be dimensioned such that the suture advancing device can pass through the first through hole and the second through hole. The first through hole can have a first longitudinal axis and the second through hole can have a second longitudinal axis. The first longitudinal axis and the second longitudinal axis can be angled with respect to each other such that the suture advancing device is guided along a first path when passing through the first through hole and the suture advancing device is guided along a second path when passing through the second through hole, the first path and the second path being at the oblique angle in the axial view of the fibula or the tibia.

In some embodiments, the first through hole and the second through hole can be axially spaced in relation to a longitudinal axis of the fibula bone plate. The first through hole and the second through hole can be transversely spaced in relation to the longitudinal axis of the fibula bone plate. The fibula engaging arrangement can include (i) a first fibula button having a first through hole and a first additional through hole, and (ii) a second fibula button having a second through hole and a second additional through hole.

In some embodiments, the suture advancing device can include a longitudinal length exceeding a transverse distance from the anteromedial surface of the tibia to the posterolateral surface of the fibula at a distal tibiofibular joint such that the suture advancing device can form a bone tunnel extending from the anteromedial surface of the tibia to the posterolateral surface of the fibula when the suture advancing device is moved through the tibia and the fibula at the distal tibiofibular joint. At least one of the first fibula button and the second fibula button can be dimensioned such that the at least one of the first fibula button and the second fibula button cannot pass through the bone tunnel.

In some embodiments, the tibia engaging arrangement can include a tibia bone plate having a first passageway and a second passageway. The first passageway and the second passageway can be dimensioned such that the suture advancing device can pass through the first passageway and the second passageway. The first passageway can include a first longitudinal axis and the second passageway has a second longitudinal axis. The first longitudinal axis and the second longitudinal axis can be angled with respect to each other such that the suture advancing device is guided along a first path when passing through the first passageway and the suture advancing device is guided along a second path when passing through the second passageway, the first path and the second path being at the oblique angle in the axial view of the fibula or the tibia.

In some embodiments, the first passageway and the second passageway can be axially spaced in relation to a longitudinal axis of the tibia bone plate. The first passageway and the second passageway can be transversely spaced in relation to the longitudinal axis of the tibia bone plate. The tibia engaging arrangement can include (i) a first tibia button having a first passageway and a first additional passageway, and (ii) a second tibia button having a second passageway and a second additional passageway.

In some embodiments, the suture advancing device can have a longitudinal length exceeding a transverse distance from the anteromedial surface of the tibia to the posterolateral surface of the fibula at a distal tibiofibular joint such that the suture advancing device can form a bone tunnel extending from the anteromedial surface of the tibia to the posterolateral surface of the fibula when the suture advancing device is moved through the tibia and the fibula at the distal tibiofibular joint. At least one of the first tibia button and the second tibia button can be dimensioned such that the at least one of the first tibia button and the second tibia button cannot pass through the bone tunnel.

In some embodiments, the method can include step (a) that includes moving the suture advancing device through the fibula and then the tibia of the distal tibiofibular joint until the proximal end of the elongated shaft is adjacent an outer surface of the tibia, step (b) that includes securing the first section of the first length of suture to the tibia engaging arrangement, and step (c) that includes moving the suture advancing device through the tibia and then the fibula of the distal tibiofibular joint until the proximal end of the elongated shaft is adjacent an outer surface of the fibula and thereafter securing the second section of the first length of suture to the fibula engaging arrangement.

In some embodiments, the method can include step (a) that includes moving the suture advancing device through the tibia and then the fibula of the distal tibiofibular joint until the proximal end of the elongated shaft is adjacent an outer surface of the fibula, step (b) that includes securing the first section of the first length of suture to the fibula engaging arrangement, and step (c) that includes moving the suture advancing device through the fibula and then the tibia of the distal tibiofibular joint until the proximal end of the elongated shaft is adjacent an outer surface of the tibia and thereafter securing the second section of the first length of suture to the tibia engaging arrangement. The elongated shaft of the suture advancing device can be cylindrical and has a diameter in a range of 0.5 to 2.5 millimeters.

In another aspect, the present disclosure provides an ankle syndesmosis repair system comprising a first anchor dimensioned to engage and be secured within an interior of a tibia, a first length of suture secured to the first anchor, a suture advancing device dimensioned to receive the first length of suture, and a fibula engaging arrangement dimensioned to engage a lateral surface of the fibula, the fibula engaging arrangement having a first through hole dimensioned to receive the first length suture. At least one of the fibula engaging arrangement and the first anchor is configured such that the first length of suture is at an oblique angle in an axial view of the fibula or the tibia when the first length of suture, the fibula engaging arrangement, and the first anchor are implanted in the ankle.

In some embodiments, the ankle syndesmosis repair system can further include a second anchor that can be dimensioned to engage and be secured within an interior of a tibia and a second length of suture that can be secured to the second anchor. The fibula engaging arrangement can include a second through hole dimensioned to receive the second length of suture and at least one of the fibula engaging arrangement, the first anchor, and the second anchor can be configured such that the first length of suture and the second length of suture are at an oblique angle in the axial view of the fibula or the tibia when the first length of suture, the second length of suture, the fibula engaging arrangement, the first anchor, and the second anchor are implanted in the ankle.

In some embodiments, the first through hole and the second through hole can be axially spaced in relation to a longitudinal axis of the fibula bone plate. The first through hole and the second through hole can be transversely spaced in relation to the longitudinal axis of the fibula bone plate. The fibula bone plate can have a third through hole located between the first through hole and the second through hole. The fibula bone plate can have a concave inner surface to conform to a surface of the fibula. The fibula engaging arrangement can include (i) a first fibula button having the first through hole and a first additional hole, and (ii) a second fibula button having the second through hole and a second additional through hole. At least one of the first fibula button and the second fibula button can have a concave inner surface to conform to a surface of the fibula. The first anchor can be configured to be guided into the tibia and engage lateral walls therein to prevent distal movement of the first anchor from the tibia.

In some embodiments, a third anchor can be dimensioned to engage and be secured within an interior of a tibia. A third length of suture can be secured to the third anchor. The fibula engaging arrangement can have a third through hole dimensioned to receive the third length of suture. At least one of the fibula engaging arrangement, the first anchor, the second anchor, and the third anchor can be configured such that the first length of suture, the second length of suture, and the third length of suture are at an oblique angle in the axial view of the fibula or the tibia when the first length of suture, the second length of suture, the third length of suture, the fibula engaging arrangement, the first anchor, the second anchor, and the third anchor are implanted in the ankle.

In another aspect, the present disclosure provides a method for performing ankle syndesmosis fixation. The method includes the steps of: (a) creating a first bone tunnel that extends through a fibula and partially into a tibia of a distal tibiofibular joint; (b) moving a first anchor secured to a first length suture, the first anchor removably secured to a distal end of a suture advancing device, through the first bone tunnel until the first anchor is proximate a first tunnel end; and (c) securing the first anchor within the first bone tunnel and removing the suture advancing device from the first bone tunnel.

In some embodiments, the method can further include (d) securing the first length suture to a fibula engaging arrangement; (e) creating a second bone tunnel that extends through a fibula and partially into a tibia of a distal tibiofibular joint; (f) moving a second anchor secured to a second length suture, the second anchor removably secured to a distal end of a suture advancing device, through the second bone tunnel until the second anchor is proximate a second tunnel end; and (g) securing the second anchor within the second bone tunnel and removing the suture advancing device from the second bone tunnel.

In some embodiments, the fibula engaging arrangement can include a fibula bone plate having a first through hole and a second through hole. The first through hole and the second through hole can be dimensioned such that the suture advancing device can pass through the first through hole and the second through hole. The first through hole can include a first longitudinal axis and the second through hole can include a second longitudinal axis. The first longitudinal axis and the second longitudinal axis can be angled with respect to each other such that the suture advancing device is guided along a first path when passing through the first through hole and the suture advancing device is guided along a second path when passing through the second through hole, the first path and the second path being at the oblique angle in the axial view of the fibula or the tibia.

In some embodiments, the first through hole and the second through hole can be transversely spaced in relation to the longitudinal axis of the fibula bone plate. The fibula engaging arrangement can include (i) a first fibula button having a first through hole and a first additional through hole, and (ii) a second fibula button having a second through hole and a second additional through hole.

In another aspect, the present disclosure provides a bone reduction clamp comprising a first arm, a second arm opposed to the first arm, and an adjustment mechanism. The second arm is connected to a guide for a bone piercing tool. The adjustment mechanism is for moving the second arm toward or away from the first arm. The adjustment mechanism includes a position adjustor that is rotatable with respect to the second arm such that rotation of the position adjustor in a first direction moves the second arm toward the first arm and rotation of the position adjustor in a second direction moves the second arm away from the first arm.

In some embodiments, one of the first arm and the second arm can include an internally threaded hole, the other of the first arm and the second arm can include an externally threaded post, and the internally threaded hole can engage the externally threaded post for translation of the first arm relative to the second arm.

In some embodiments, the guide can include a first guide hole having a first longitudinal axis and a second guide hole having a second longitudinal axis, the first longitudinal axis and the second longitudinal axis being angled with respect to each other such that the bone piercing tool is guided along a first path when passing through the first guide hole and the bone piercing tool is guided along a second path when passing through the second guide hole, the first path and the second path being at an oblique angle.

In some embodiments, the guide can include a third guide hole having a third longitudinal axis, the first longitudinal axis and the third longitudinal axis being angled with respect to each other such that the bone piercing tool is guided along a third path when passing through the third guide hole, the first path and the third path being at an oblique angle.

In another aspect, the present disclosure provides a method for performing ankle syndesmosis fixation. The method includes the steps of (a) applying pressure to one of a fibula and a tibia with the first arm of the bone reduction clamp of the present disclosure; (b) applying pressure to the other of the fibula and the tibia with the guide of the bone reduction clamp; (c) moving a suture advancing device comprising an elongated shaft having a distal end terminating in a pointed tip and a proximal end through a guide hole of the guide, and through the fibula and through the tibia of a distal tibiofibular joint until the proximal end of the elongated shaft is adjacent an outer surface of one of the fibula and the tibia, wherein the proximal end receives a first length of suture; (d) securing a first section of the first length of suture to one of a fibula engaging arrangement and a tibia engaging arrangement; and (e) securing a second section of the first length of suture to the other of the fibula engaging arrangement and the tibia engaging arrangement.

In another aspect, the present disclosure provides a jig mechanism for guiding a suture advancing device. The jig mechanism comprises a first tubular guide having a first tubular passageway having a first axis; a second tubular guide having a second tubular passageway having a second axis; a first support attached to the first tubular guide; a second support attached to the second tubular guide; and a support spacer configured to connect the first support and the second support, the support spacer defining a distance between the first tubular guide and the second tubular guide. The support spacer is configured such that the first axis and the second axis can be aligned to be substantially collinear.

In some embodiments, the jig mechanism can further include a suture advancing device including an elongated shaft having a distal end and a proximal end, the distal end terminating in a pointed tip, the proximal end being dimensioned to individually receive a first length of a suture.

In some embodiments, the support spacer can include a jig adjuster configured to increase and decrease the distance between the first tubular guide and the second tubular guide. The jig adjuster can include a threaded telescoping section of the support spacer. The jig adjuster can be rotated in a first direction to increase the distance between the first tubular guide and the second tubular guide. The jig adjuster can be rotated in a second direction to decrease the distance between the first tubular guide and the second tubular guide. The first tubular passageway can be dimensioned to slidably receive the suture advancing device. The second tubular passageway can be dimensioned to slidably receive the suture advancing device.

In some embodiments, the jig mechanism can further include a suture removal slot formed in the second tubular guide. The suture removal slot can have a width such that a suture may be removed from inside the second tubular passageway after being threaded through the second tubular passageway by the suture advancing device.

In some embodiments, the suture advancing device can be dimensioned to be guided by the jig mechanism through a fibula and a tibia at a tibiofibular joint. The first tubular guide can be structured to be aligned on a posterolateral surface of the fibula. The second tubular guide can be structured to be aligned on an anteromedial surface of the tibia. The suture advancing device can be structured to be passed through the first tubular passageway, a tibiofibular joint, and the second tubular passageway to create a first bone tunnel.

In another aspect, the present disclosure provides a method for guiding a suture advancing device during ankle syndesmosis fixation. The method can include (a) locating the jig mechanism such that the first tubular guide is aligned on a posterolateral surface of a fibula and such that the second tubular guide is aligned on an anteromedial surface of a tibia; (b) moving a suture advancing device comprising an elongated shaft through the fibula and the tibia until a proximal end of the elongated shaft is adjacent an outer surface of the fibula or the tibia, the proximal end receiving a first length of suture; (c) securing a first section of the first length of suture to a fibula engaging arrangement; and (d) securing a second section of the first length of suture to the fibula engaging arrangement.

In some embodiments, the method can further include (e) locating the jig mechanism such that the first tubular guide is aligned on a second posterolateral surface of the fibula and such that the second tubular guide is aligned on a second anteromedial surface of the tibia; and (f) moving the suture advancing device through the second tubular passageway, the tibiofibular joint, and the first tubular passageway to create a second bone tunnel.

These and other features, aspects, and advantages of the present invention will become better understood upon consideration of the following detailed description, drawings, and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

Figure 1:
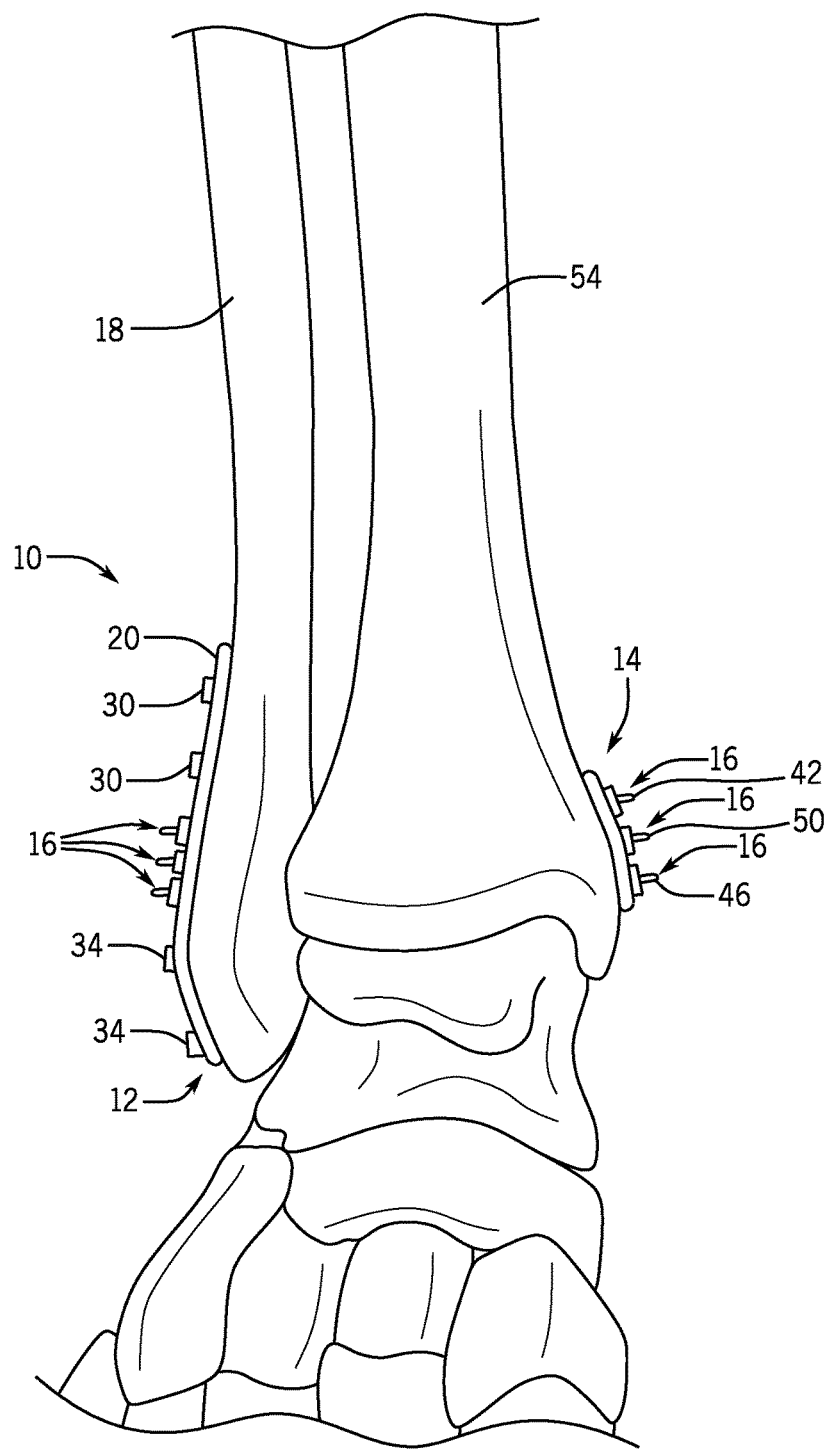
FIG. 1 shows a front elevational view of an ankle syndesmosis repair system in accordance with the invention.

Referring to FIG. 1, an ankle syndesmosis repair system 10 for stabilizing the syndesmosis of an ankle is shown. The system 10 includes a fibula engaging arrangement 12 and a tibia engaging arrangement 14 coupled together by a plurality of lengths of suture 16.

As best shown in FIG. 1 and FIGS. 6A-6C, the fibula engaging arrangement 12 is dimensioned to engage a lateral surface of a fibula 18. For example, the fibula engaging arrangement 12 comprises a fibula bone plate 20 having a concave inner surface 21 (shown in FIGS. 6A-6C) configured to conform to the lateral surface of the fibula 18.

Figure 2:
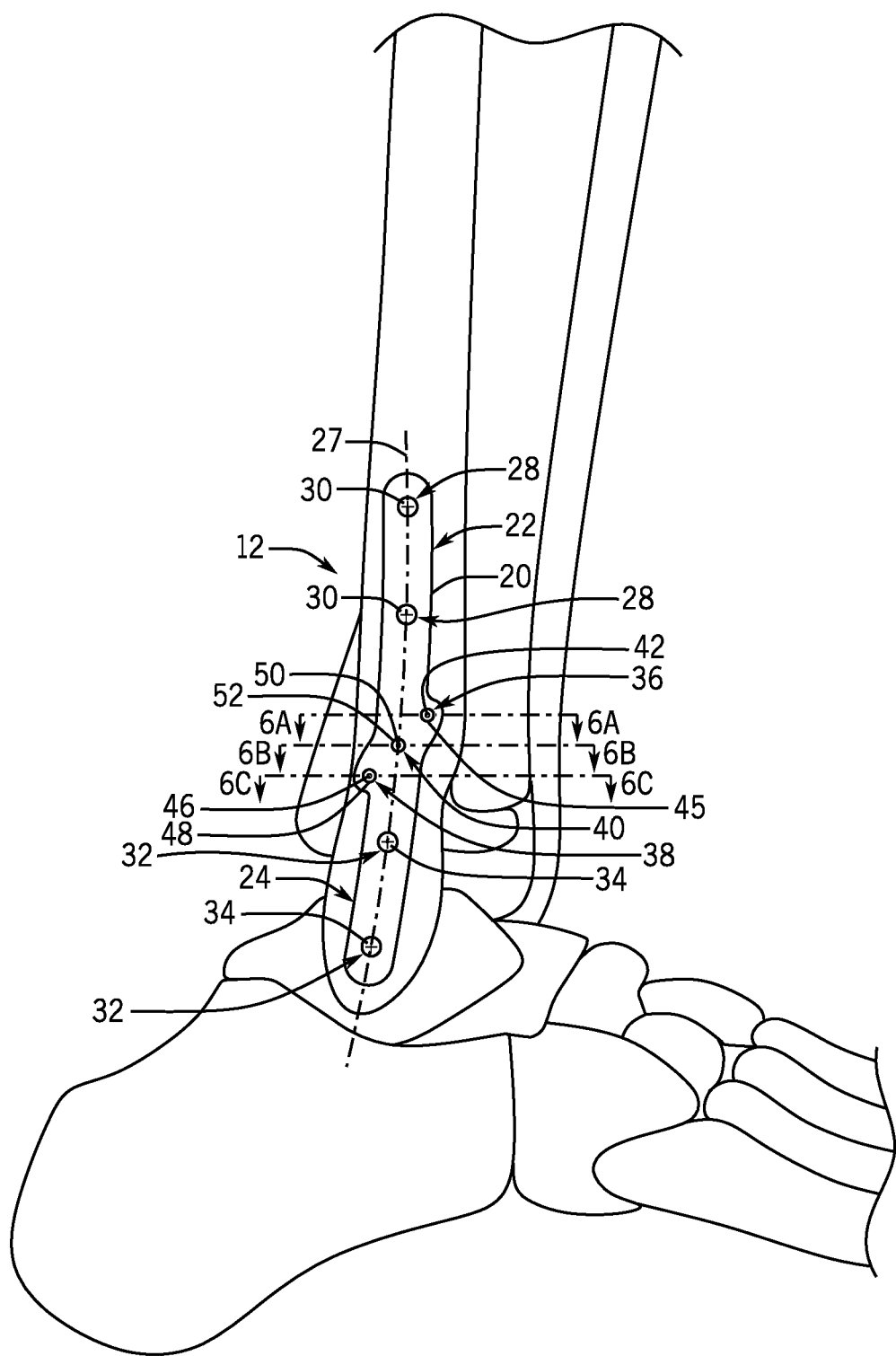
FIG. 2 shows a lateral view of the ankle syndesmosis repair system of FIG. 1, showing a fibula engaging arrangement implanted on the fibula of a subject.

Referring now to FIG. 2, the fibula bone plate 20 includes an upper screw receiving portion 22 and a lower screw receiving portion 24 connected by a central suture receiving portion 26.

The upper screw receiving portion 22 extends axially upward from the central suture receiving portion 26, along a longitudinal axis 27 of the fibula bone plate 20. The upper screw receiving portion 22 includes a plurality of bone screw apertures 28. In the illustrated non-limiting example, the upper screw receiving portion 22 includes two bone screw apertures 28. In other examples, the upper screw receiving portion 22 can include one, three, or any other suitable number of bone screw apertures 28, as necessary. The plurality of bone screw apertures 28 may be sized to receive a plurality of bone screws 30. The plurality of bone screws 30 are configured to secure the fibula bone plate 20 to the fibula 18.

The lower screw receiving portion 24 extends axially downward from the central suture receiving portion 26, along the longitudinal axis 27 of the fibula bone plate 20. The lower screw receiving portion 24 similarly includes a plurality of bone screw apertures 32. Similarly, in the illustrated non-limiting example, the lower screw receiving portion 24 includes two bone screw apertures 32. In other examples, the lower screw receiving portion 24 can include one, three, or any other suitable number of bone screw apertures 32, as necessary. The plurality of bone screw apertures 32 may be sized to receive a plurality of bone screws 34. The plurality of bone screws 34 are configured to secure the fibula bone plate 20 to the fibula 18.

The central suture receiving portion 26 is disposed between the upper screw receiving portion 22 and the lower screw receiving portion 24. The central suture receiving portion 26 comprises a first through hole 36, a second through hole 38, and a third through hole 40. The first through hole 36, the second through hole 38, and the third through hole 40 are of a smaller inside diameter compared to the bone screw apertures 28 and the bone screw apertures 32.

The first through hole 36 is dimensioned to receive a first length of suture 42. The first length of suture 42 may be secured within the first through hole 36 by a first fibula button 45 of the fibula engaging arrangement 12. The second through hole 38 is dimensioned to receive a second length of suture 46. The second length of suture 46 may be secured within the second through hole 38 by a second fibula button 48 of the fibula engaging arrangement 12. The third through hole 40 is dimensioned to receive a third length of suture 50. The third length of suture 50 may be secured within the third through hole 40 by a third fibula button 52 of the fibula engaging arrangement 12.

In the illustrated non-limiting example, the first, second, and third fibula buttons 45, 48, 52 each have a concave inner surface configured to conform to a surface of the fibula bone plate 20. In some non-limiting examples, the first, second, and third fibula buttons 45, 48, 52 may each have a concave inner surface configured to conform to the fibula 18 directly.

As illustrated, the first through hole 36 and the second through hole 38 are axially spaced in relation to the longitudinal axis 27 of the fibula bone plate 20. The first through hole 36 and the second through hole 38 are also transversely spaced in relation to the longitudinal axis 27 of the fibula bone plate 20. The third through hole 40 is arranged between the first through hole 36 and the second through hole 38. The third through hole 40 is substantially aligned with the longitudinal axis 27 of the fibula bone plate 20.

It should be appreciated that, while in the non-limiting illustrated example there are three through holes 36, 38, 40, in some other non-limiting examples, the central suture receiving portion 26 may comprise more or less than three through holes. Further, while in the non-limiting illustrated example the first, second, and third through holes 36, 38, 40 are generally aligned, in other non-limiting examples the through holes can be misaligned or in other arrangements generally as necessary for a given desired treatment.

Figure 3:
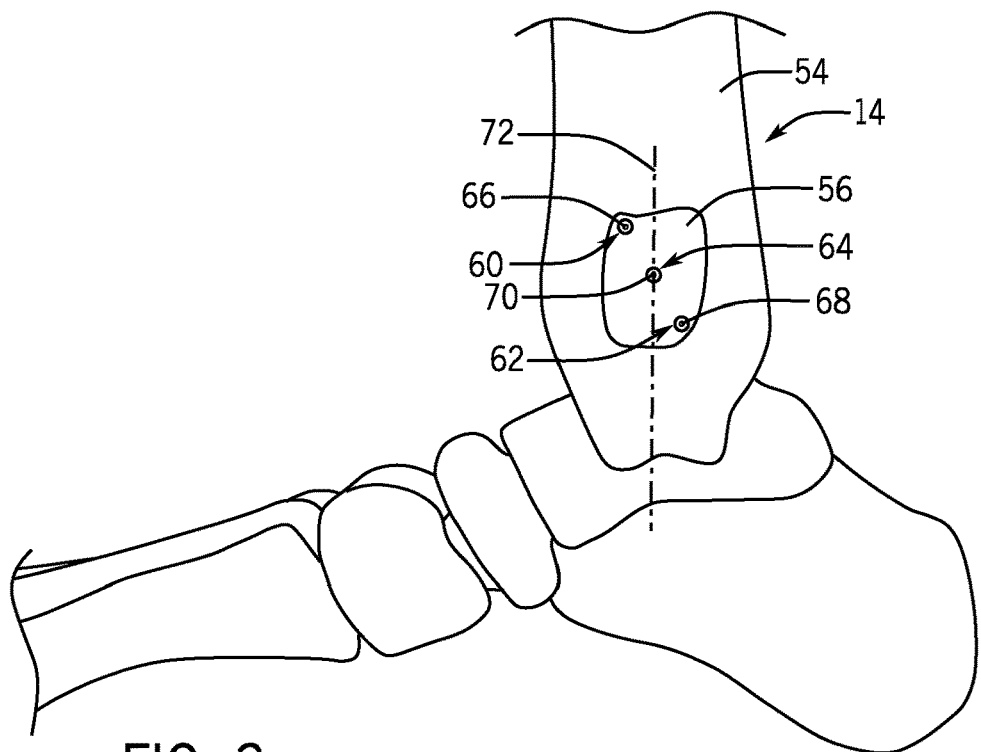
FIG. 3 shows a medial view of the ankle syndesmosis repair system of FIG. 1.

Referring now to FIG. 3, the tibia engaging arrangement 14 may be dimensioned to engage a medial surface of a tibia 54. For example, the tibia engaging arrangement 14 may comprise a tibia bone plate 56 having a concave inner surface 58 (shown in FIGS. 6A-6C) configured to conform to the medial surface of the tibia 54. The tibia bone plate 56 comprises a first passageway 60, a second passageway 62, and a third passageway 64.

The first passageway 60 is dimensioned to receive the first length of suture 42. The first length of suture 42 may be secured within the first passageway 60 by a first tibia button 66 of the tibia engaging arrangement 14. The second passageway 62 is dimensioned to receive the second length of suture 46. The second length of suture 46 may be secured within the second passageway 62 by a second tibia button 68 of the tibia engaging arrangement 14. The third passageway 64 is dimensioned to receive the third length of suture 50. The third length of suture 50 may be secured within the third passageway 64 by a third tibia button 70 of the tibia engaging arrangement 14.

In the illustrated non-limiting example, the first, second, and third tibia buttons 66, 68, 70 each have a concave inner surface configured to conform to a surface of the tibia bone plate 56. In some non-limiting examples, the first, second, and third tibia buttons 66, 68, 70 may each have a concave inner surface configured to conform to the tibia 54 directly.

Accordingly, in some instances, the tibia bone plate 56 may not be included in the tibia engaging arrangement 14, and the first, the second, and the third lengths of suture 42, 46, 50 may be secured by the first, second, and third tibia buttons 66, 68, 70, which may directly contact the tibia 54. In these instances, the first, second, and third buttons 66, 68, 70 may have a larger diameter to prevent damage of the tibial metaphysis by increasing the surface area that is in contact with the tibia 54. For example, the first, second, and third tibia buttons 66, 68, 70 may have a diameter of 4 millimeters to 15 millimeters and may be configured to conform directly to the tibia 54.

As illustrated, the first passageway 60 and the second passageway 62 are axially spaced in relation to a longitudinal axis 72 of the tibia bone plate 56. The first passageway 60 and the second passageway 62 are also transversely spaced in relation to the longitudinal axis 72 of the tibia bone plate 56. The third passageway 64 is arranged between the first passageway 60 and the second passageway 62. The third passageway 64 is substantially aligned with the longitudinal axis of the tibia bone plate 56.

It should similarly be appreciated that, while in the non-limiting illustrated example there are three passageways 60, 62, 64, in some other non-limiting examples, the tibia bone plate 56 may comprise more or less than three passageways. Further, while in the non-limiting illustrated example of FIG. 3, the first, second, and third passageways 60, 62, 64 are generally aligned, in other non-limiting examples, the passageways can be misaligned or in other arrangements generally as necessary for a given desired treatment. Additionally, the passageways 60, 62, 64 of the tibia bone plate 56 may generally correspond to the through holes 36, 38, 40 of the fibula bone plate 20.

Figure 3A:
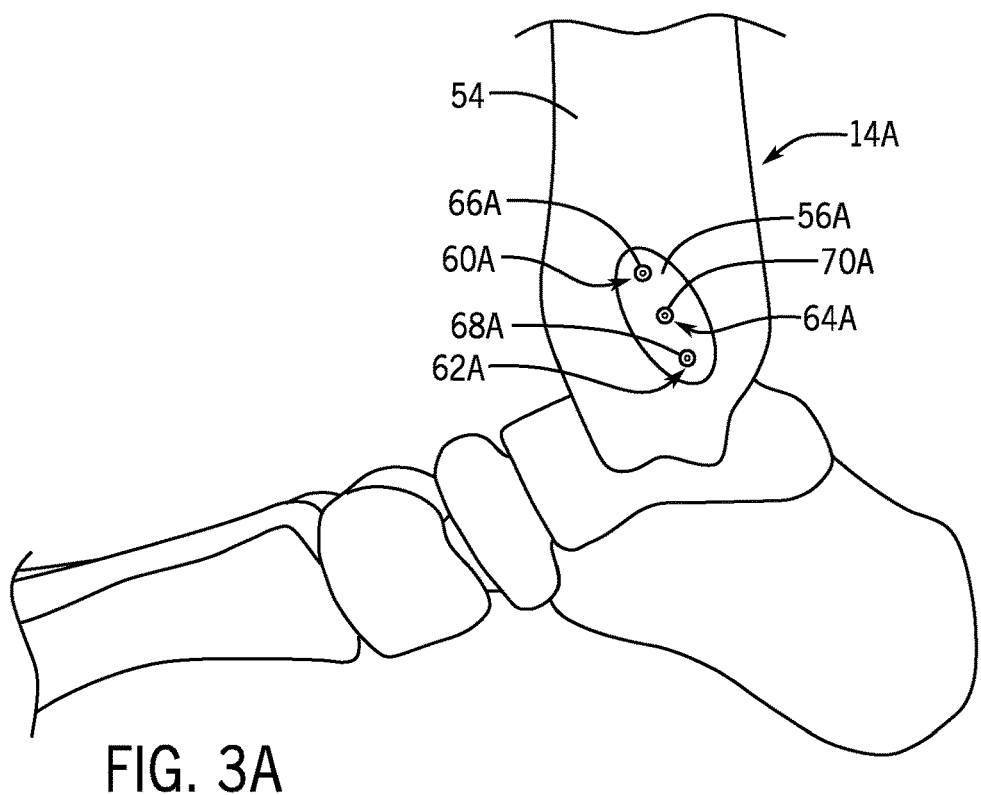
FIG. 3A shows a medial view of another tibia engaging plate of another ankle syndesmosis repair system in accordance with the invention.

It should be appreciated that the non-limiting shape of the tibia bone plate 56 illustrated in FIG. 3 may be of a more or less oblong or rectangular shape. For example, FIG. 3A illustrates another embodiment of a tibia engaging arrangement 14A. The tibia engaging arrangement 14A may be dimensioned to engage a medial surface of a tibia 54. For example, the tibia engaging arrangement 14A may comprise a tibia bone plate 56A having a concave inner surface configured to conform to the medial surface of the tibia 54. The tibia bone plate 56A comprises a first passageway 60A, a second passageway 62A, and a third passageway 64A.

The first passageway 60A is dimensioned to receive the first length of suture 42. The first length of suture 42 may be secured within the first passageway 60A by a first tibia button 66A of the tibia engaging arrangement 14A. The second passageway 62A is dimensioned to receive the second length of suture 46. The second length of suture 46 may be secured within the second passageway 62A by a second tibia button 68A of the tibia engaging arrangement 14A. The third passageway 64A is dimensioned to receive the third length of suture 50. The third length of suture 50 may be secured within the third passageway 64A by a third tibia button 70A of the tibia engaging arrangement 14A.

In the illustrated non-limiting example, the first, second, and third tibia buttons 66A, 68A, 70A each have a concave inner surface configured to conform to a surface of the tibia bone plate 56A. In some non-limiting examples, the first, second, and third tibia buttons 66A, 68A, 70A may each have a concave inner surface configured to conform to the tibia 54 directly.

Accordingly, in some instances, the tibia bone plate 56A may not be included in the tibia engaging arrangement 14A, and the first, the second, and the third lengths of suture 42, 46, 50 may be secured by the first, second, and third tibia buttons 66A, 68A, 70A, which may directly contact the tibia 54. In these instances, the first, second, and third buttons 66A, 68A, 70A may have a larger diameter to prevent damage of the tibial metaphysis by increasing the surface area that is in contact with the tibia 54. For example, the first, second, and third tibia buttons 66A, 68A, 70A may have a diameter of 4 millimeters to 15 millimeters and may be configured to conform directly to the tibia 54.

As illustrated, the first passageway 60A and the second passageway 62A are axially spaced in relation to a longitudinal axis of the tibia bone plate 56A. The first passageway 60A and the second passageway 62A are also transversely spaced in relation to the longitudinal axis of the tibia bone plate 56A. The third passageway 64A is arranged between the first passageway 60A and the second passageway 62A. The third passageway 64A is substantially aligned with the longitudinal axis of the tibia bone plate 56A.

Figure 3B:
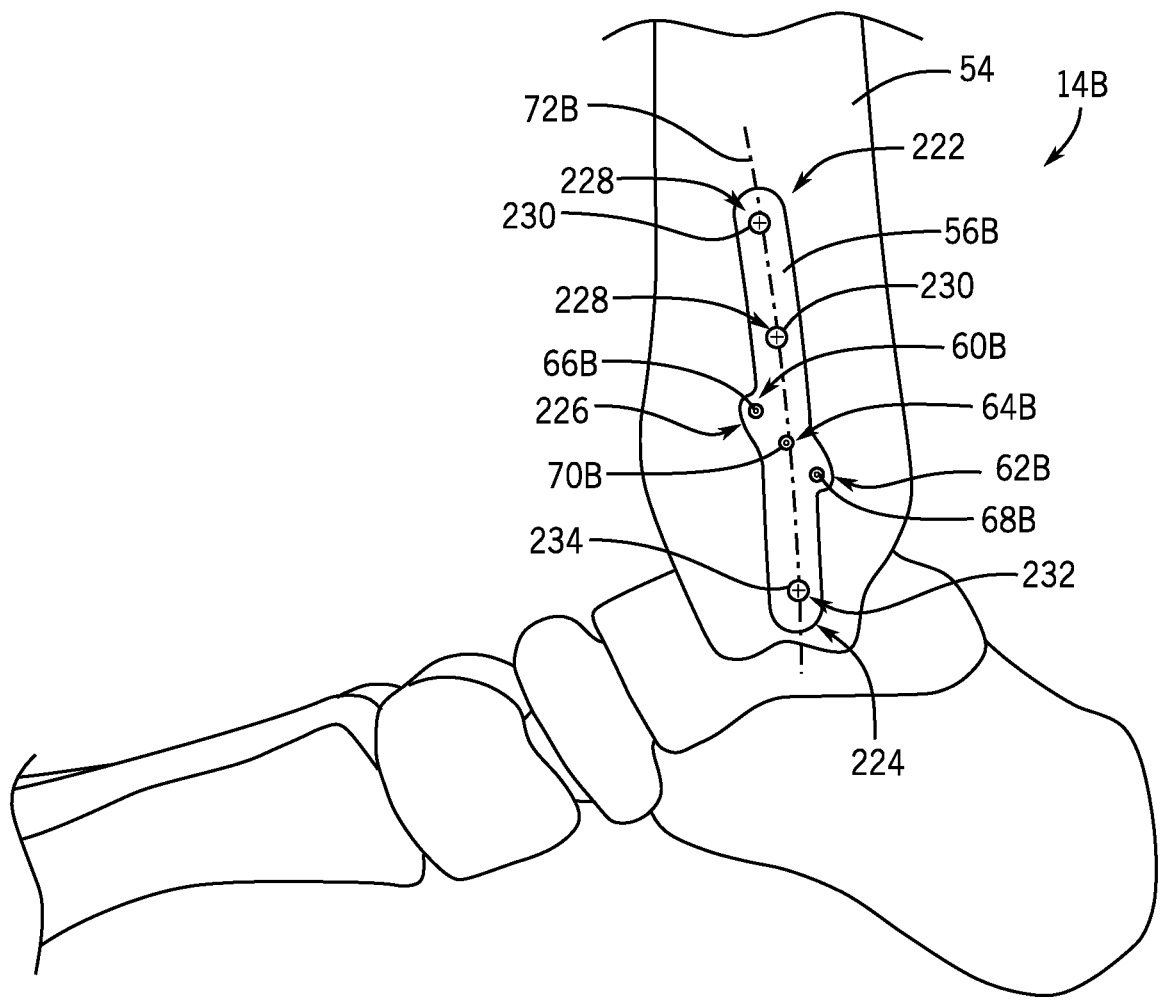
FIG. 3B shows a medial view of another tibia engaging plate of another ankle syndesmosis repair system in accordance with the invention.

Referring now to FIG. 3B, another embodiment of a tibia engaging arrangement 14B may be dimensioned to engage the medial surface of the tibia 54. For example, the tibia engaging arrangement 14B may comprise a tibia bone plate 56B configured to conform to the medial surface of the tibia 54. The tibia bone plate 56B comprises an upper screw receiving portion 222 and a lower screw receiving portion 224 connected by a central suture receiving portion 226.

The upper screw receiving portion 222 extends axially upward from the central suture receiving portion 226, along a longitudinal axis 72B of the tibia bone plate 56B. The upper screw receiving portion 222 includes a plurality of bone screw apertures 228. In the illustrated non-limiting example, the upper screw receiving portion 222 includes two bone screw apertures 228. In other examples, the upper screw receiving portion 222 can include one, three, or any other suitable number of bone screw apertures 228, as necessary. The plurality of bone screw apertures 228 may be sized to receive a plurality of bone screws 230. The plurality of bone screws 230 are configured to secure the tibia bone plate 56B to the tibia 54.

The lower screw receiving portion 224 extends axially downward from the central suture receiving portion 226, along the longitudinal axis 72B of the tibia bone plate 56B. The lower screw receiving portion 224 similarly includes a plurality of bone screw apertures 232. Similarly, in the illustrated non-limiting example, the lower screw receiving portion 224 includes two bone screw apertures 232. In other examples, the lower screw receiving portion 224 can include one, three, or any other suitable number of bone screw apertures 232, as necessary. The plurality of bone screw apertures 232 may be sized to receive a plurality of bone screws 234. The plurality of bone screws 234 are configured to secure the tibia bone plate 56B to the tibia 54.

The central suture receiving portion 226 is disposed between the upper screw receiving portion 222 and the lower screw receiving portion 224. The central suture receiving portion 226 comprises a first passageway 60B, a second passageway 62B, and a third passageway 64B.

The first passageway 60B is dimensioned to receive the first length of suture 42. The first length of suture 42 may be secured within the first passageway 60B by a first tibia button 66B of the tibia engaging arrangement 14B. The second passageway 62B is dimensioned to receive the second length of suture 46. The second length of suture 46 may be secured within the second passageway 62B by a second tibia button 68B of the tibia engaging arrangement 14B. The third passageway 64B is dimensioned to receive the third length of suture 50. The third length of suture 50 may be secured within the third passageway 64B by a third tibia button 70B of the tibia engaging arrangement 14B.

In the illustrated non-limiting example, the first, second, and third tibia buttons 66B, 68B, 70B each have a concave inner surface configured to conform to a surface of the tibia bone plate 56B. In some non-limiting examples, the first, second, and third tibia buttons 66B, 68B, 70B may each have a concave inner surface configured to conform to the tibia 54 directly.

As illustrated, the first passageway 60B and the second passageway 62B are axially spaced in relation to the longitudinal axis 72B of the tibia bone plate 56B. The first passageway 60B and the second passageway 62B are also transversely spaced in relation to the longitudinal axis 72B of the tibia bone plate 56B. The third passageway 64B is arranged between the first passageway 60B and the second passageway 62B. The third passageway 64 is substantially aligned with the longitudinal axis 72B of the tibia bone plate 56B.

It should similarly be appreciated that, while in the non-limiting illustrated example there are three passageways 60B, 62B, 64B, in some other non-limiting examples, the tibia bone plate 56 may comprise more or less than three passageways.

Figure 4A:
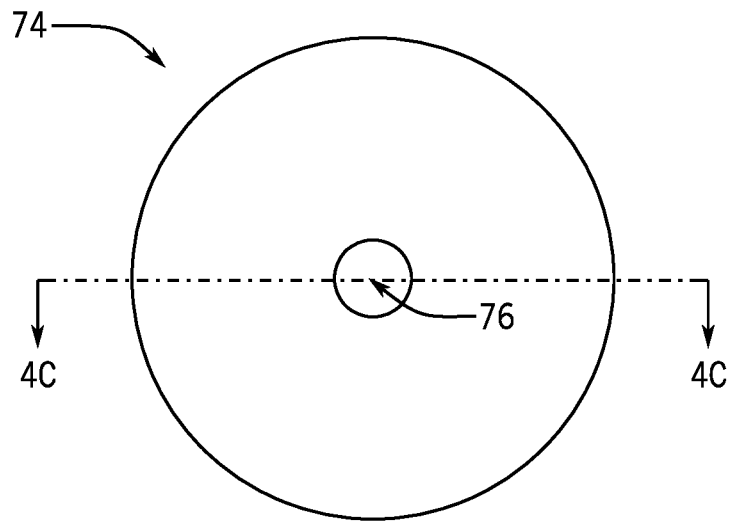
FIG. 4A shows a front elevational view of an exemplary button for use with the ankle syndesmosis repair system of FIG. 1.
Figure 4B:
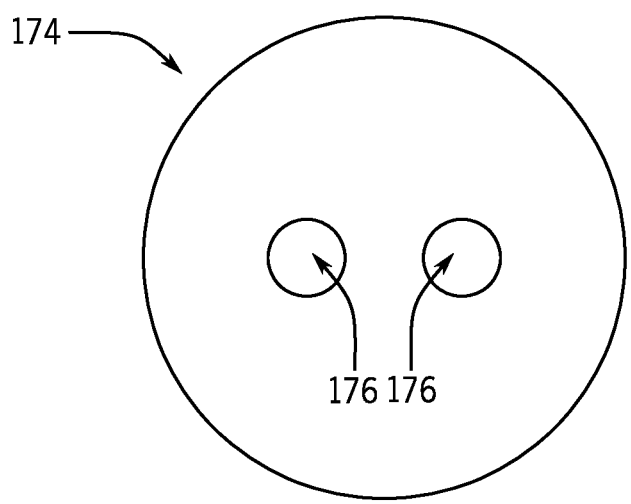
FIG. 4B shows a front elevational view of another exemplary button for use with the ankle syndesmosis repair system of FIG. 1.
Figure 4C:
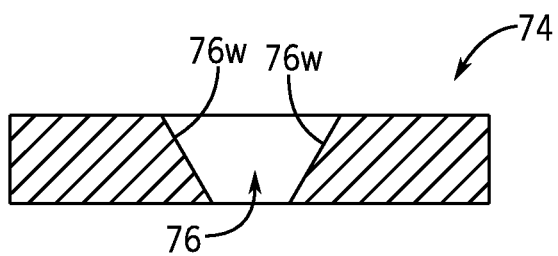
FIG. 4C shows a cross-sectional view of the button of FIG. 4A taken along line 4C-4C of FIG. 4A.

Referring now to FIGS. 4A and 4C, an exemplary button 74 is shown. The exemplary button 74 may be substantially similar to any of the fibula buttons 45, 48, 52 and/or any of the tibia buttons 66, 68, 70, such that the following description of the exemplary button 74 may also apply to any of the fibula buttons 45, 48, 52 and/or any of the tibia buttons 66, 68, 70.

As illustrated in FIGS. 4A and 4C, the button 74 can include a single through hole 76 having an inner wall 76w defining a conical shape for the hole 76. The wider end of the conical shape of the hole 76 allows one to more easily guide the suture into the hole 76. Each of the through holes 76 may be dimensioned to receive any of the first, second, and third lengths of suture 42, 46, 50. The narrower end of the conical shape of the through holes 76 may further be dimensioned only slightly larger than a thickness of the corresponding length of suture 42, 46, 50 received therein. As such, the corresponding length of suture 42, 46, 50 can be passed through the through hole 76, and can subsequently have a knot tied thereon, preventing the corresponding length of suture 42, 46, 50 from backing out of the through hole 76.

As illustrated in FIG. 4B, another embodiment of a button 174 includes a pair of through holes 176. Each of the through holes 176 may be dimensioned to receive any of the first, second, and third lengths of suture 42, 46, 50. The through holes 176 may further be dimensioned only slightly larger than a thickness of the corresponding length of suture 42, 46, 50 received therein. Because the button 174 includes a pair of through holes 176, the corresponding length of suture 42, 46, 50 may be passed through each of the through holes 176, and can subsequently have the knot tied thereon to prevent the corresponding length of suture 42, 46, 50 from backing out of the through holes 176.

Figure 1A:
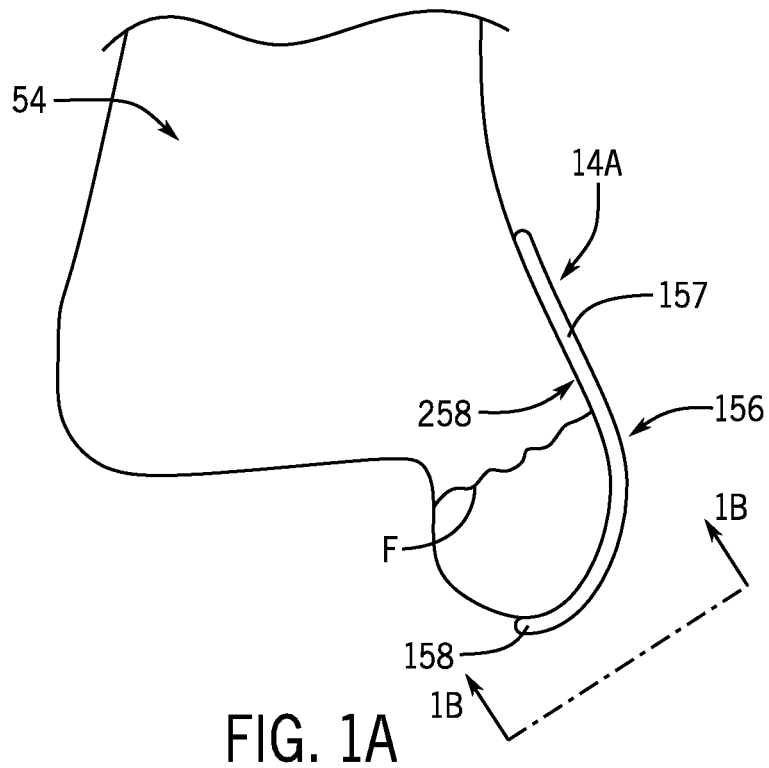
FIG. 1A shows a front elevational view of tibia engaging plate of another ankle syndesmosis repair system in accordance with the invention.
Figure 1B:
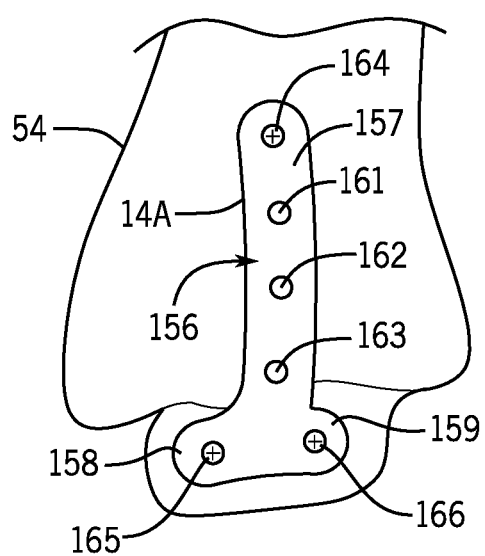
FIG. 1B shows a detailed view of the tibia engaging plate of FIG. 1A taken along line 1B-1B of FIG. 1A.

Looking now at FIGS. 1A and 1B, another embodiment of the tibia engaging arrangement 14A may be dimensioned to engage a medial surface of a tibia 54 having a fracture F. The tibia engaging arrangement 14A comprises a tibia bone plate 156 having an inner surface 258 (shown in FIG. 1A) configured to conform to the medial surface of the tibia 54. The tibia bone plate 156 includes a longitudinal section 157 and a pair of flanges 158, 159 that extend outwardly from a distal end of the tibia bone plate 156. The tibia bone plate 156 also includes a first passageway 161, a second passageway 162, a third passageway 163, a fourth passageway 164, a fifth passageway 165 and a sixth passageway 166. The first passageway 160 is dimensioned to receive the first length of suture 42. The first length of suture 42 may be secured within the first passageway 60 by a first tibia button 66 of the tibia engaging arrangement 14A. The second passageway 162 is dimensioned to receive the second length of suture 46. The second length of suture 46 may be secured within the second passageway 162 by a second tibia button 68 of the tibia engaging arrangement 14A. The third passageway 163 is dimensioned to receive the third length of suture 50. The third length of suture 50 may be secured within the third passageway 163 by a third tibia button 70 of the tibia engaging arrangement 14A. The fourth passageway 164, the fifth passageway 165, and the sixth passageway 166 may each receive a bone screw when the tibia bone plate 156 engages a medial surface of a tibia 54.

Figure 2A:
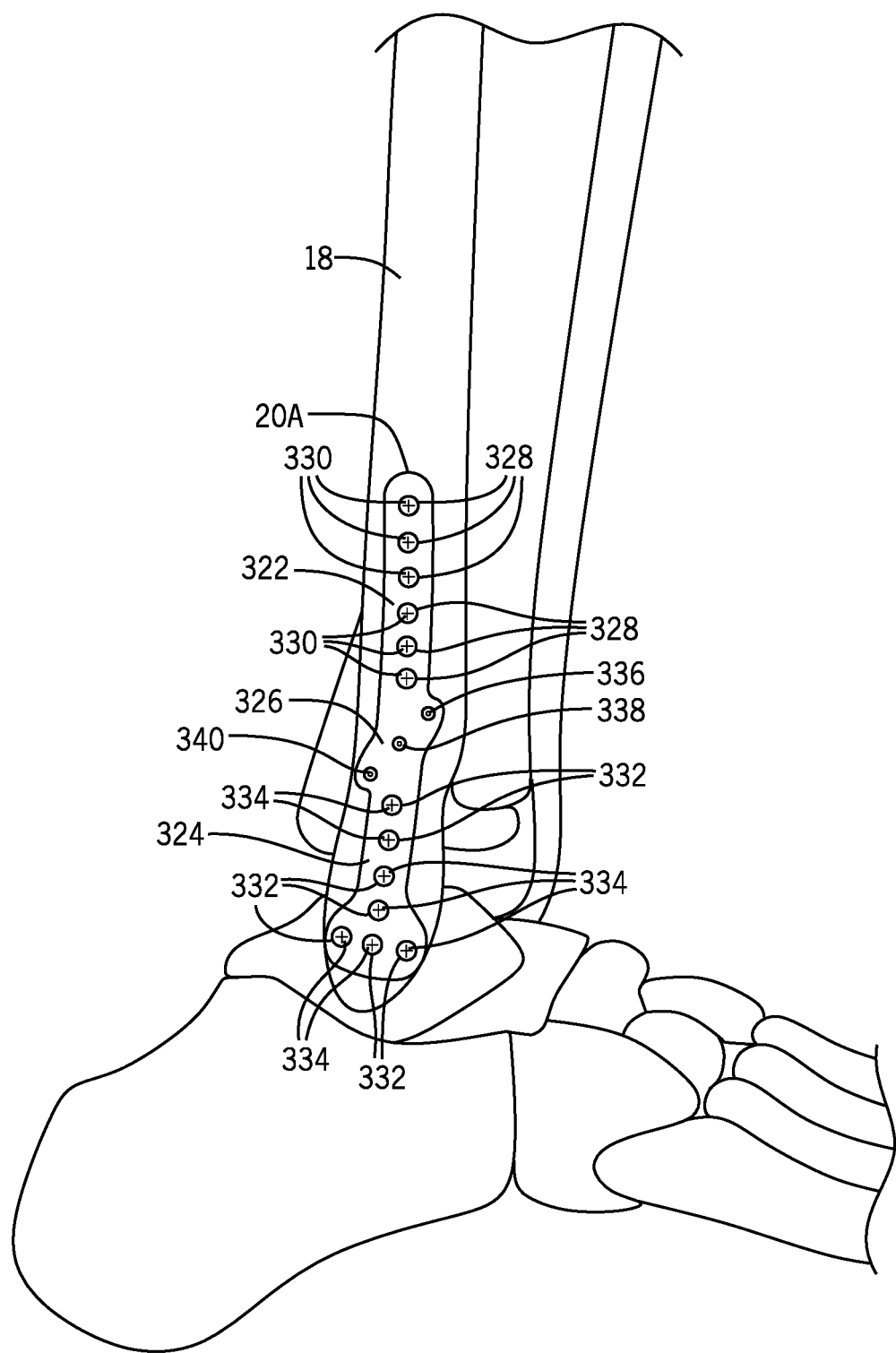
FIG. 2A shows a lateral view of another ankle syndesmosis repair system, showing another embodiment of a fibula engaging plate in accordance with the invention.

Referring now to FIG. 2A, another embodiment of a fibula bone plate 320 includes an upper screw receiving portion 322 and a lower screw receiving portion 324 connected by a central suture receiving portion 326. The upper screw receiving portion 322 extends axially upward from the central suture receiving portion 326, along a longitudinal axis of the fibula bone plate 20A. The upper screw receiving portion 322 includes a plurality of bone screw apertures 328. In the illustrated non-limiting example, the upper screw receiving portion 322 includes six bone screw apertures 328. In other examples, the upper screw receiving portion 322 can include one, three, or any other suitable number of bone screw apertures 328, as necessary. The plurality of bone screw apertures 328 may be sized to receive a plurality of bone screws 330. The plurality of bone screws 330 are configured to secure the fibula bone plate 20A to the fibula 18.

The lower screw receiving portion 324 extends axially downward from the central suture receiving portion 326, along the longitudinal axis of the fibula bone plate 20A. The lower screw receiving portion 324 similarly includes a plurality of bone screw apertures 332. Similarly, in the illustrated non-limiting example, the lower screw receiving portion 324 includes seven bone screw apertures 332. In other examples, the lower screw receiving portion 324 can include one, three, or any other suitable number of bone screw apertures 332, as necessary. The plurality of bone screw apertures 332 may be sized to receive a plurality of bone screws 334. The plurality of bone screws 334 are configured to secure the fibula bone plate 20A to the fibula 18.

The central suture receiving portion 326 is disposed between the upper screw receiving portion 322 and the lower screw receiving portion 324. The central suture receiving portion 326 comprises a first through hole 336, a second through hole 338, and a third through hole 340.

The first through hole 336 is dimensioned to receive a first length of suture 42. The first length of suture 42 may be secured within the first through hole 336 by a first fibula button 45 of the fibula engaging arrangement 12. The second through hole 338 is dimensioned to receive a second length of suture 46. The second length of suture 46 may be secured within the second through hole 338 by a second fibula button 48 of the fibula engaging arrangement 12. The third through hole 340 is dimensioned to receive a third length of suture 50. The third length of suture 50 may be secured within the third through hole 340 by a third fibula button 52 of the fibula engaging arrangement 12.

It should be appreciated that, while in the non-limiting illustrated example there are three through holes 336, 338, 340, in some other non-limiting examples, the central suture receiving portion 326 may comprise more or less than three through holes. Further, while in the non-limiting illustrated example the first, second, and third through holes 336, 338, 340 are generally aligned, in other non-limiting examples the through holes can be misaligned or in other arrangements generally as necessary for a given desired treatment.

Figure 5:
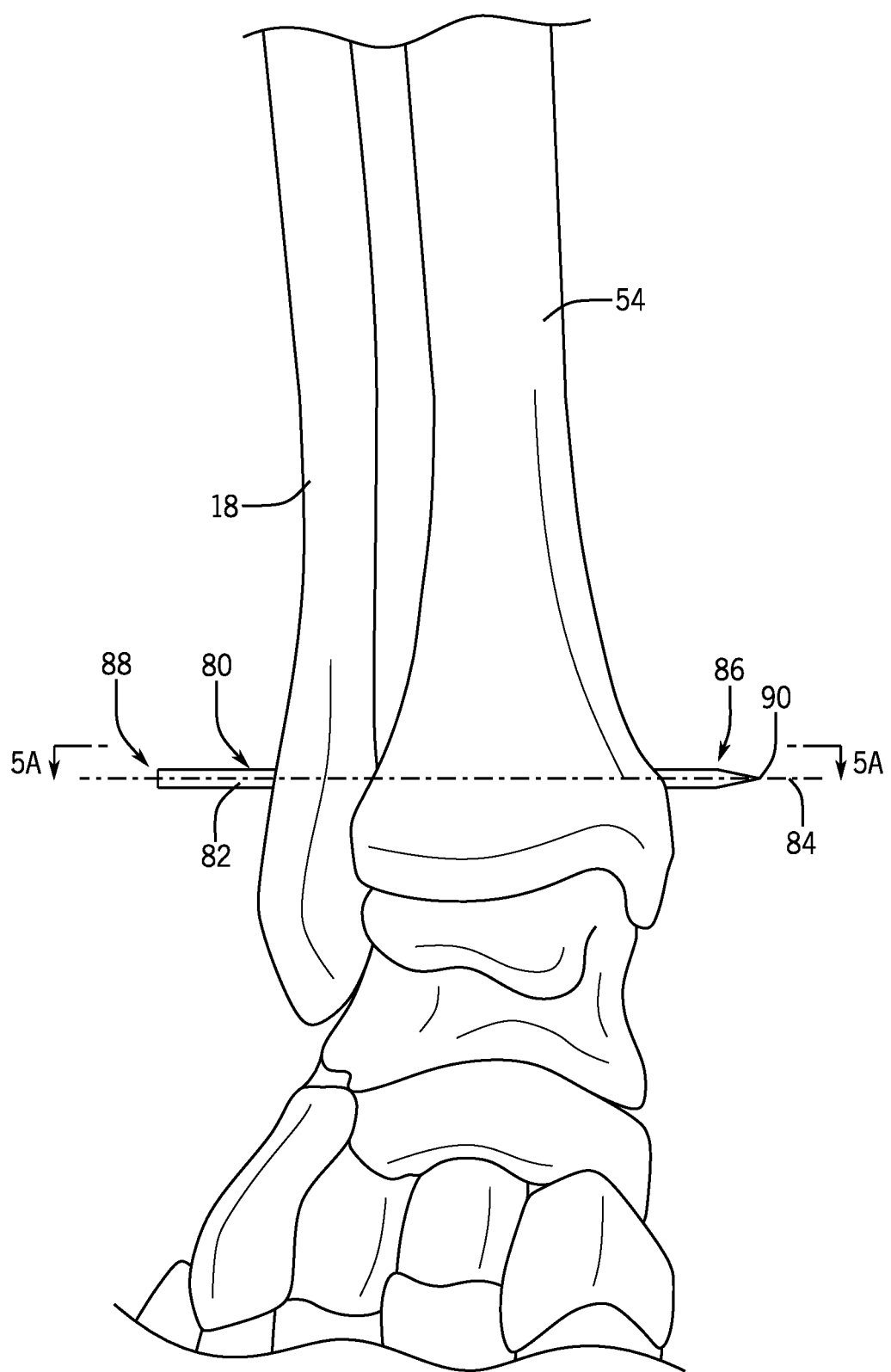
FIG. 5 shows a front elevational view of a suture advancing device of the ankle syndesmosis repair system of FIG. 1 being moved medially through a fibula and tibia.
Figures 5A, 5B:
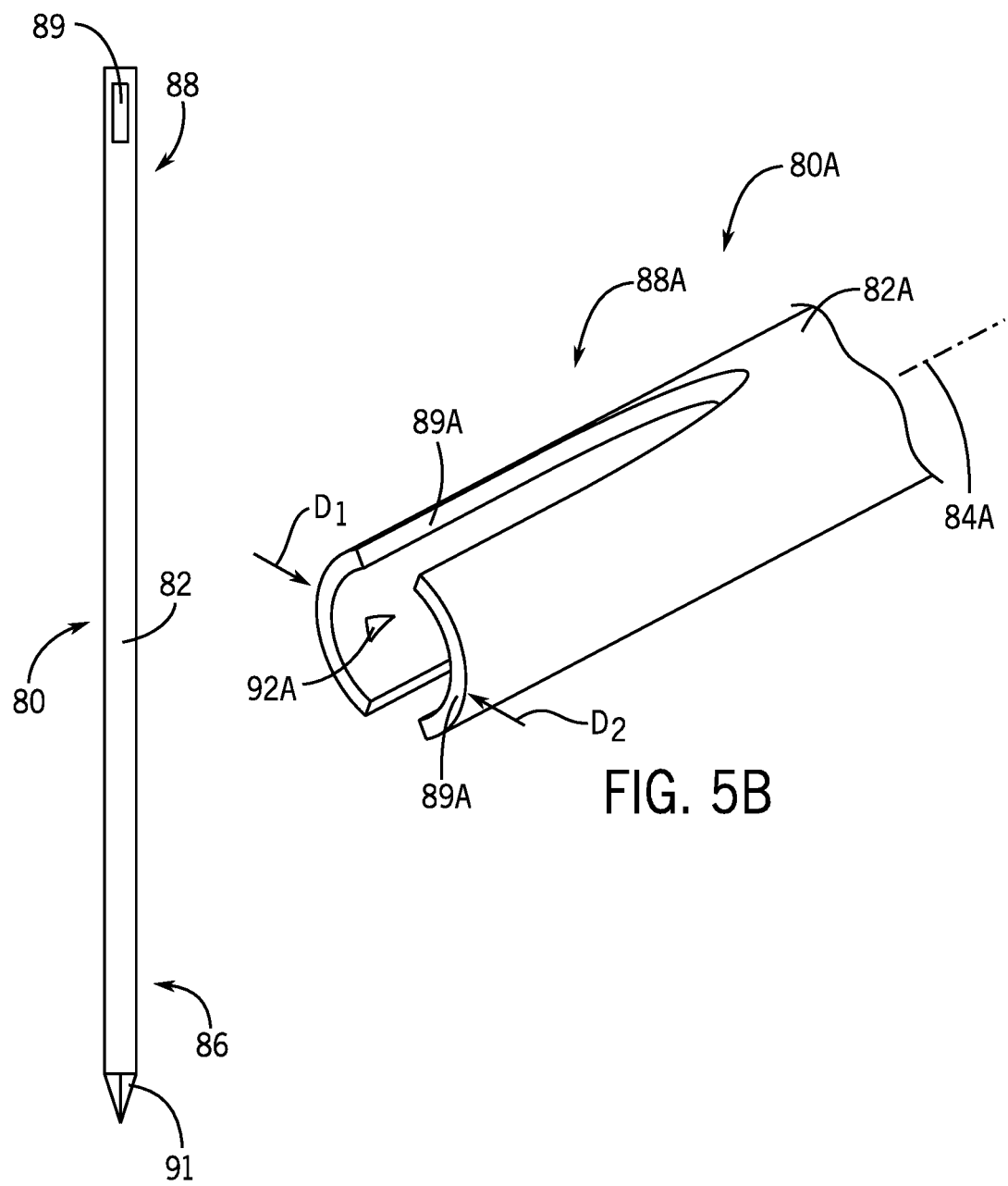
FIG. 5A shows a side elevational view of the suture advancing device of FIG. 5 taken along line 5A-5A of FIG. 5.
FIG. 5B shows a perspective view of suture retaining tabs of a proximal end of another suture advancing device in accordance with the invention.

Referring now to FIGS. 5 and 5A, a suture advancing device 80 comprises an elongated shaft 82 extending along a longitudinal axis 84. The suture advancing device 80 may comprise, for example, a K-wire or any other suitable suture advancing device. The suture advancing device 80 may comprise Nitinol or stainless steel. The suture advancing device 80 has a distal end 86 and a proximal end 88. The distal end 86 terminates in a pointed tip 90 having four generally triangular sides 91. The proximal end 88 includes an aperture 89 dimensioned to individually receive any of the first length of suture 42, the second length of suture 46, and the third length of suture 50.

As illustrated, the suture advancing device 80 has a longitudinal length exceeding a transverse distance from an anteromedial surface of the tibia 54 to the posterolateral surface of the fibula 18 at the distal tibiofibular joint. As such, the suture advancing device 80 can form a bone tunnel extending from the anteromedial surface of the tibia 54 to the posterolateral surface of the fibula 18 when the suture advancing device 80 is moved through the tibia 54 and the fibula 18 at the distal tibiofibular joint.

In some non-limiting examples, the suture advancing device 80 may have a diameter in a range of 0.5 millimeters to 2.5 millimeters. For example, the suture advancing device 80 may have a diameter of approximately 1 millimeter. In some other non-limiting examples, the suture advancing device 80 may have a diameter in a range of 0.1 millimeters to 2.5 millimeters.

In some non-limiting examples, each of the first, second, and third fibula buttons 45, 48, 52 and each of the first, second, and third tibia buttons 66, 68, 70 have a minimum outside diameter that is larger than the outside diameter of the suture advancing device 80. As such, each of the first, second, and third fibula buttons 45, 48, 52 and each of the first, second, and third tibia buttons 66, 68, 70 are dimensioned such that none of the first, second, and third fibula buttons 45, 48, 52 or the first, second, and third tibia buttons 66, 68, 70 can pass through a bone tunnel created by the suture advancing device 80, as will be described below.

Referring now to FIG. 5B, another embodiment of a suture advancing device 80A comprises an elongated shaft 82A extending along a longitudinal axis 84A. The suture advancing device 80A may comprise, for example, a K-wire or any other suitable suture advancing device. The suture advancing device 80A has a distal end that terminates in a pointed tip having four generally triangular sides identical to the suture advancing device 80 of FIGS. 5 and 5A. The suture advancing device 80A has a proximal end 88A including a pair of suture retaining tabs 89A. A length of suture may be inserted between the suture retaining tabs 89A and the suture retaining tabs 89A may be moved together in directions D1 and D2 in order to capture the length of suture between the suture retaining tabs 89A. A tooth 92A of the suture retaining tabs 89A can also engage the length of suture. One advantage of the suture advancing device 80A is that no doubling over of suture is required in order to pass the length of suture through the bone tunnel extending from the anteromedial surface of the tibia 54 to the posterolateral surface of the fibula 18 when the suture advancing device 80A is moved through the tibia 54 and the fibula 18 at the distal tibiofibular joint.

Figure 6A:
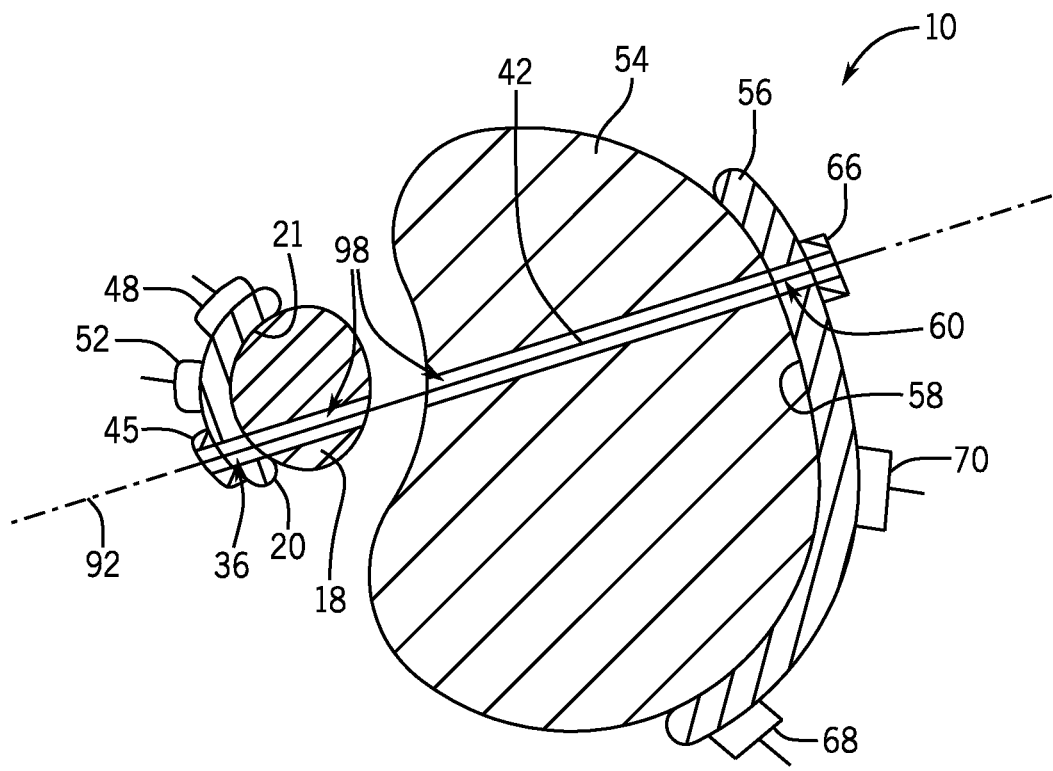
FIG. 6A is a cross-sectional view of the ankle syndesmosis repair system of FIG. 1, taken along line 6A-6A of FIG. 2.
Figure 6B:
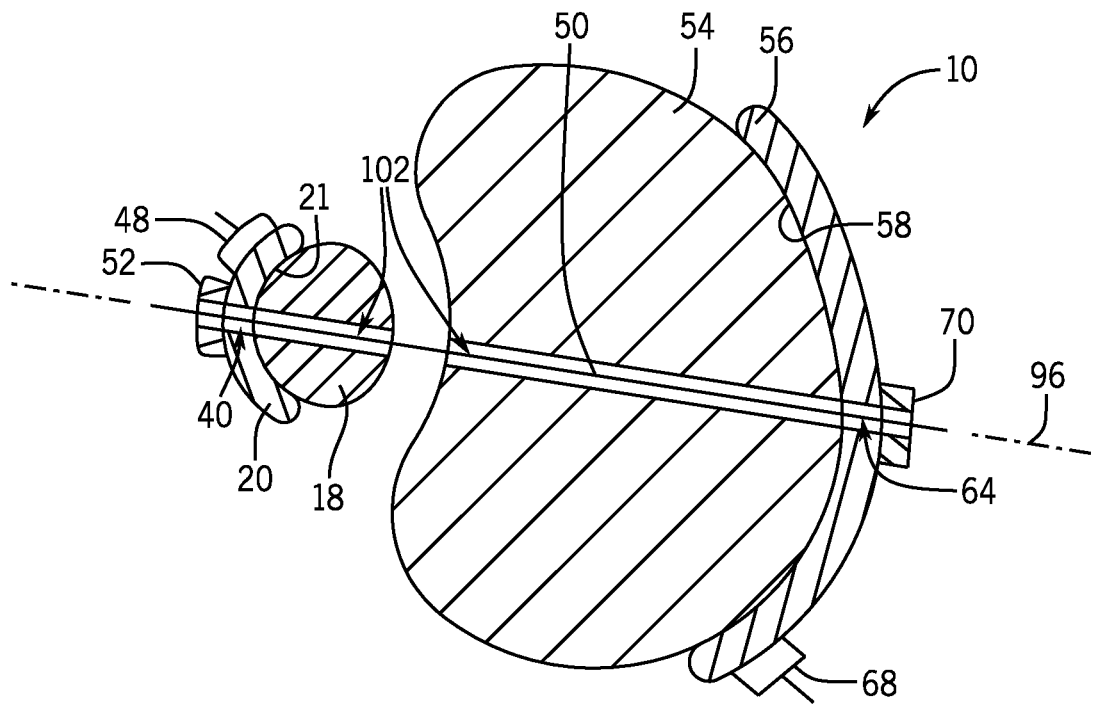
FIG. 6B is a cross-sectional view of the ankle syndesmosis repair system of FIG. 1, taken along line 6B-6B of FIG. 2.
Figure 6C:
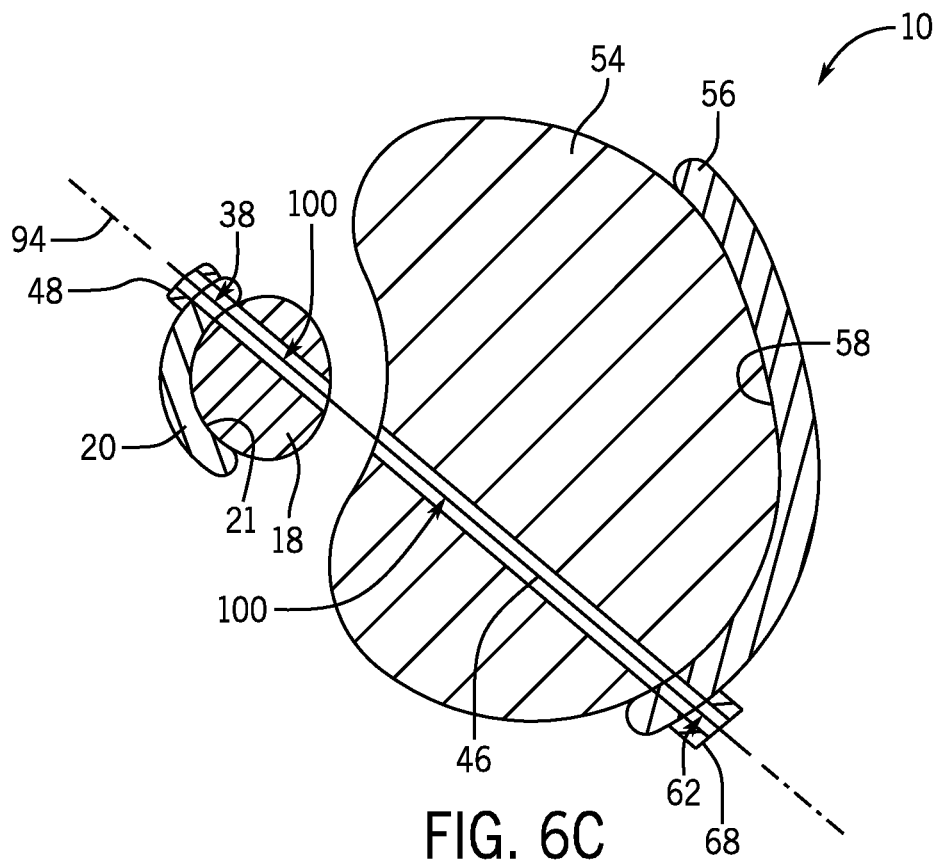
FIG. 6C is a cross-sectional view of the ankle syndesmosis repair system of FIG. 1, taken along line 6C-6C of FIG. 2.

Referring now to FIGS. 6A-6C, when the ankle syndesmosis repair system 10 is implanted on the syndesmosis of the ankle, the first through hole 36 of the fibula bone plate 20 and the first passageway 60 of the tibia bone plate 56 are coaxially arranged about a first longitudinal axis 92 (shown in FIG. 6A). The second through hole 38 of the fibula bone plate 20 and the second passageway 62 of the tibia bone plate 56 are coaxially arranged about a second longitudinal axis 94 (shown in FIG. 6C). The third through hole 40 of the fibula bone plate 20 and the third passageway 64 of the tibia bone plate 56 are coaxially arranged about a third longitudinal axis 96 (shown in FIG. 6B).

As illustrated, the first through hole 36 is arranged on an anterolateral side of the fibula 18 and the first passageway 60 is arranged on a posteromedial side of the tibia 54. Further, the first through hole 36 and the first passageway 60 are dimensioned such that the suture advancing device 80 or the suture advancing device 80A can pass through each of the first through hole 36 and the first passageway 60. As such, the suture advancing device 80 or the suture advancing device 80A can be used to create a first bone tunnel 98 extending, along the first longitudinal axis 92, from the anterolateral side of the fibula 18 to the posteromedial side of the tibia 54.

The second through hole 38 is arranged on the lateral side of the fibula 18 and the second passageway 62 is arranged on the medial side of the tibia 54. Further, the second through hole 38 and the second passageway 62 are dimensioned such that the suture advancing device 80 or the suture advancing device 80A can pass through each of the second through hole 38 and the second passageway 62. As such, the suture advancing device 80 or the suture advancing device 80A can be used to create a second bone tunnel 100 extending, along the second longitudinal axis 94, from the lateral side of the fibula 18 to the medial side of the tibia 54.

The third through hole 40 is arranged on the posterolateral side of the fibula 18 and the third passageway 64 is arranged on the anteromedial side of the tibia 54. Further, the third through hole 40 and the third passageway 64 are dimensioned such that the suture advancing device 80 or the suture advancing device 80A can pass through each of the third through hole 40 and the third passageway 64. As such, the suture advancing device 80 or the suture advancing device 80A can be used to create a third bone tunnel 102 extending, along the third longitudinal axis 96, from the posterolateral side of the fibula 18 to the anteromedial side of the tibia 54.

As illustrated, the first longitudinal axis 92 and the second longitudinal axis 94 are angled with respect to each other in the axial view of the fibula 18 or the tibia 54. Further, the third longitudinal axis 96 is arranged between the first longitudinal axis 92 and the second longitudinal axis 94, such that the third longitudinal axis 96 is at an angle with respect to each of the first longitudinal axis 92 and the second longitudinal axis 94 in the axial view of the fibula 18 or the tibia 54.

Figure 6D:
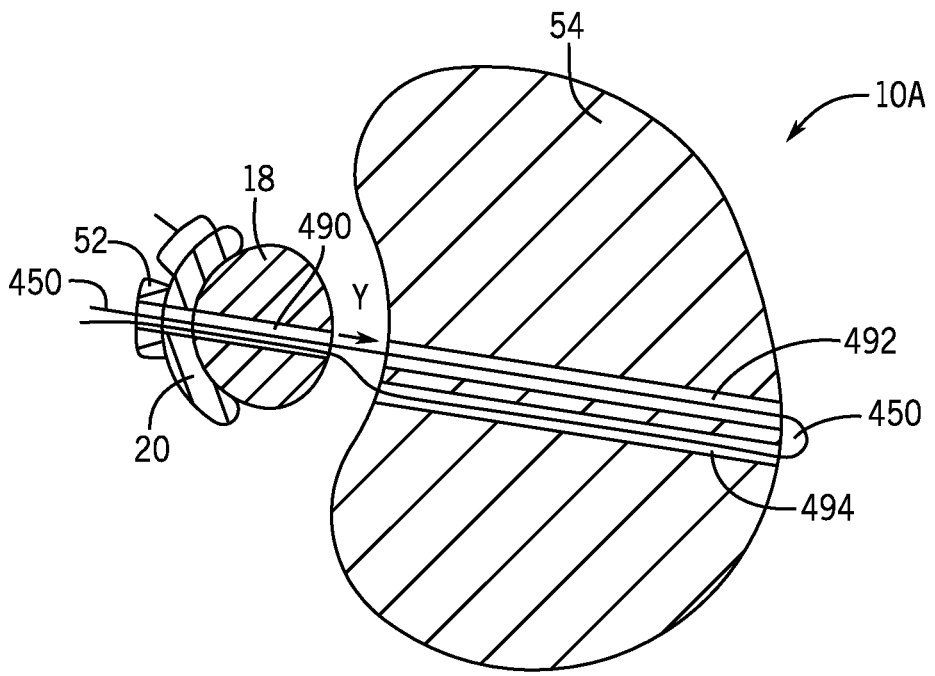
FIG. 6D is a cross-sectional view, similar to FIG. 6B, of another ankle syndesmosis repair system in accordance with the invention.

Looking now at FIG. 6D, another embodiment of an ankle syndesmosis repair system 10A for stabilizing the syndesmosis of an ankle is shown. The surgeon may first fix the fibula bone plate 20 onto the lateral side of the fibula 18. The surgeon may then use the suture advancing device 80A, having the first length of suture 450 received between the suture retaining tabs 89A, to create a first bone tunnel 490 through the fibula 18. Once the first bone tunnel 490 is created, the suture advancing device 80A can be advanced medially to create a second bone tunnel 492 through the tibia 54 until the suture advancing device 80A is completely through the second bone tunnel 492. The suture advancing device 80A can then be advanced laterally to create a third bone tunnel 494 through the tibia 54 and then the suture advancing device 80A can be directed laterally back through the first bone tunnel 490 in the fibula 18. The surgeon may then remove the length of suture 450 from the suture advancing device 80A, move the fibula 18 in direction Y to contact the tibia 54, and secure the length of suture 450 at opposite ends using the fibula button 52. Optionally, the length of suture 450 can be passed through adjacent holes in a tibia button located adjacent the medial openings of the second bone tunnel 492 and the third bone tunnel 494. While FIG. 6D shows bone tunnels 490, 492 and 494 at an axial plane along line 6B-6B of FIG. 2, additional similar bone tunnels can be provided at an axial plane along line 6A-6A of FIG. 2 and at an axial plane along line 6C-6C of FIG. 2 allowing for the use of additional suture and an additional fibula button with each of these additional bone tunnels in the same manner of attachment shown in FIG. 6D.

Figure 7A:
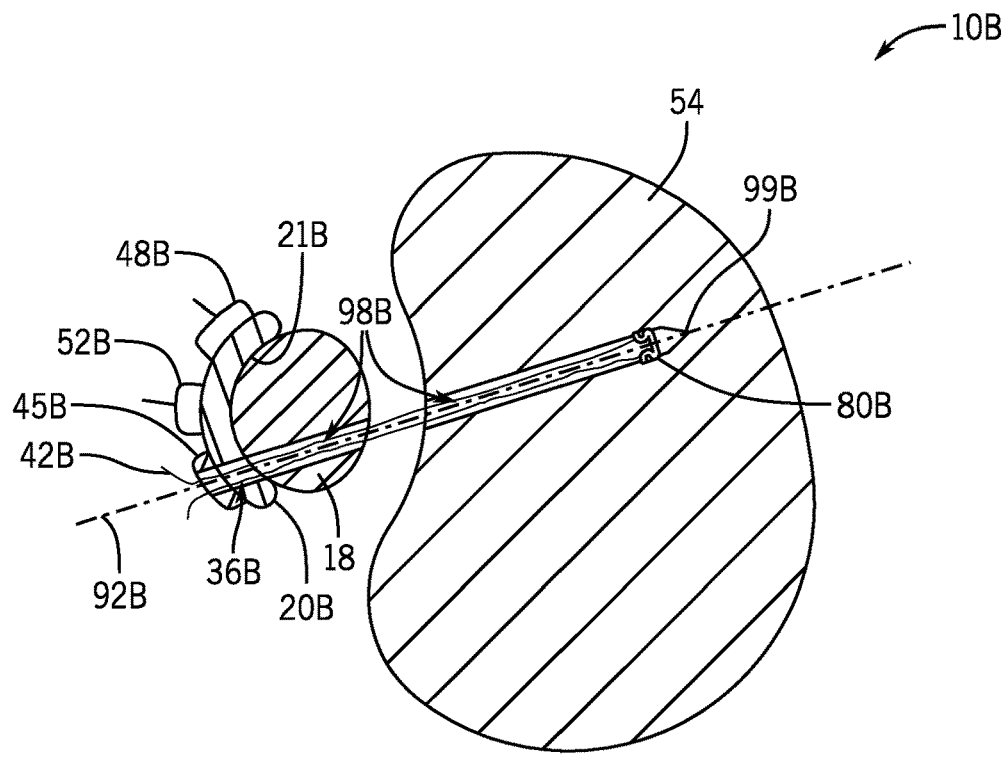
FIG. 7A is a cross-sectional view of an ankle syndesmosis repair system extending in a first direction in accordance with the invention.
Figure 7B:
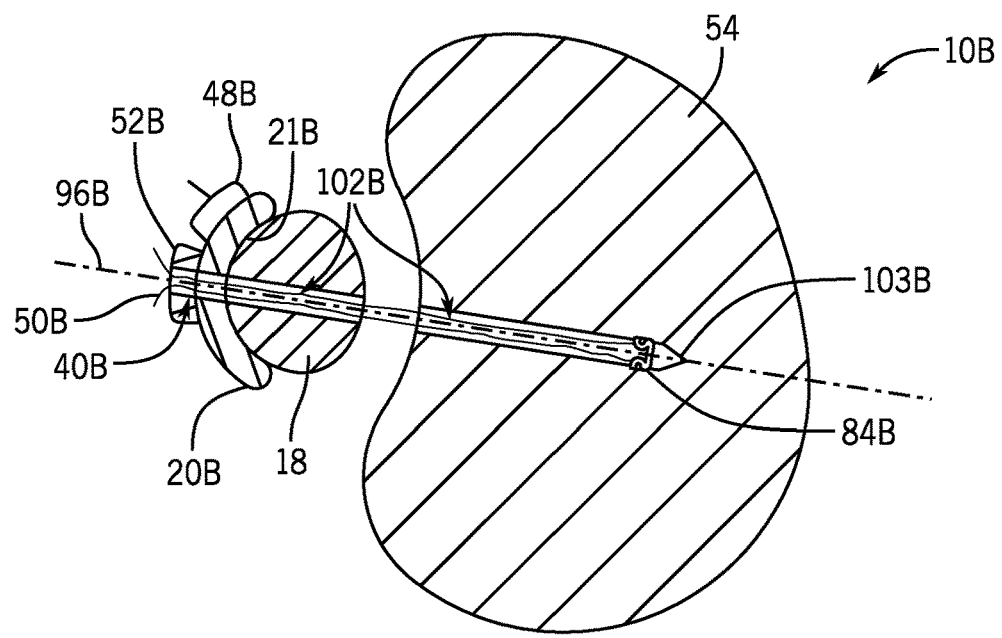
FIG. 7B is a cross-sectional view of the ankle syndesmosis repair system of FIG. 7A, extending in a second direction in accordance with the invention.
Figure 7C:
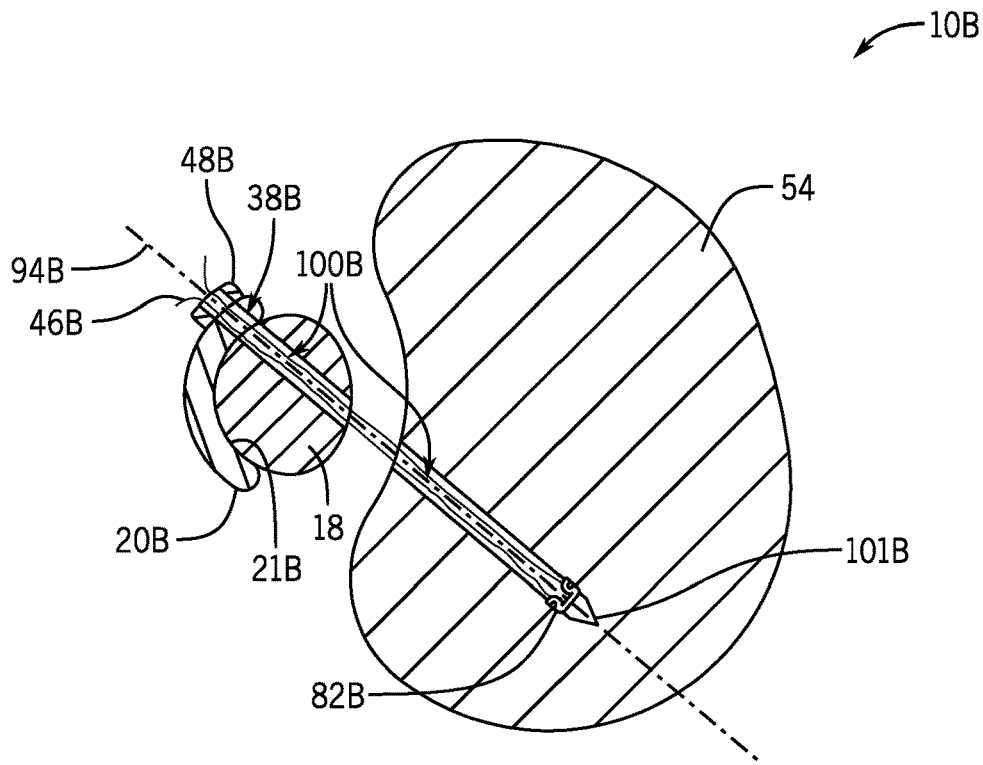
FIG. 7C is a cross-sectional view of the ankle syndesmosis repair system of FIG. 7A, extending in a third direction in accordance with the invention.

Referring now to FIGS. 7A-7C, an ankle syndesmosis repair system 10B for stabilizing the syndesmosis of an ankle according to another embodiment is illustrated. The ankle syndesmosis repair system is generally similar to the ankle syndesmosis repair system 10 illustrated in FIGS. 6A-6C, therefore like-reference numbers will be used where applicable. Like the ankle syndesmosis repair system 10, the ankle syndesmosis repair system 10B includes a fibula bone plate 20B having a concave inner surface 21B configured to conform to the lateral surface of the fibula 18.

The fibula bone plate 20B includes a first through hole 36B that is dimensioned to receive a first length of suture 42B which may be secured within the first through hole 36B by a first fibula button 45B. A second through hole 38B within the fibula bone plate 20B is dimensioned to receive a second length suture 46B that can be secured within the second through hole 38B by a second fibula button 48B. A third through hole 40B within the fibula bone plate 20B is dimensioned to receive a third length suture 50B that can be secured within the third through hole 40B by a third fibula button 52B As illustrated in FIG. 7A, the ankle syndesmosis repair system 10B further includes a first anchor 80B that can be secured within a first bone tunnel 98B that extends through the fibula 18 and partially into the tibia 54. In the illustrated embodiment, the first anchor 80B is secured within the tibia 54. When the ankle syndesmosis repair system 10B is implanted on the syndesmosis of the ankle, the first through hole 36B of the first bone tunnel 98B are coaxially arranged about a first longitudinal axis 92B. As illustrated, the first through hole 36B is arranged on an anterolateral side of the fibula 18.

In some embodiments, the fibula bone plate 20B may first engage and be fixed to the fibula 18. The first bone tunnel 98B may then be formed by a variety of tunnel forming devices. The first through hole 36B and the first bone tunnel 98B are dimensioned such that a suture advancing device (not shown) can pass through each of the first through hole 36B and the first bone tunnel 98B. In use, the suture advancing device may be equipped with the first anchor 80B removably attached at a distal end and the first length of suture 42B secured to the first anchor 80B. The suture advancing device may then be moved through the first bone tunnel 98B in the fibula 18 and through the lateral cortex of the tibia of the distal tibiofibular joint until the first anchor 80B is located proximate to a tunnel end 99B within the first bone tunnel 98B and does not penetrate through the medial cortex of the distal tibia 54.

The first anchor 80B may then be released from the suture advancing device and deployed to engage side walls of the first bone tunnel 98B. In other embodiments, the first anchor 80B may include one or more of barbs, threads, arms, etc. that provide a securing feature to secure the first anchor 80B within the first bone tunnel 98B. Following the securement of the first anchor 80B and the first length of suture 42B within the tibia 54, the first length suture 42B may then be secured at a second end within the first through hole 36B by the first fibula button 45B.

As illustrated in FIG. 7B, the ankle syndesmosis repair system 10B further includes a third anchor 84B that can be secured within a third bone tunnel 102B that extends through the fibula 18 and partially into the tibia 54. In the illustrated embodiment, the third anchor 84B is secured within the tibia 54. When the ankle syndesmosis repair system 10B is implanted on the syndesmosis of the ankle, the third through hole 40B of the third bone tunnel 102B are coaxially arranged about a third longitudinal axis 96B. As illustrated, the third through hole 40B is arranged on an anterolateral side of the fibula 18.

The third bone tunnel 102B may be formed by a variety of tunnel forming devices. The third through hole 40B and the third bone tunnel 102B are dimensioned such that the suture advancing device can pass through each of the third hole 40B and the third bone tunnel 102B. In use, the suture advancing device may be equipped with the third anchor 84B removably attached at a distal end and the third length of suture 50B secured to the third anchor 84B. The suture advancing device may then be moved through the third bone tunnel 102B until the third anchor 84B is located proximate to a tunnel end 103B within the third bone tunnel 102B.

The third anchor 84B may then be released from the suture advancing device and deployed to engage side walls of the third bone tunnel 102B. In other embodiments, the third anchor 84B may include one or more of barbs, threads, arms, etc. that provide a securing feature to secure the third anchor 84B within the third bone tunnel 102B. Following the securement of the third anchor 84B and the third length of suture 50B within the tibia 54, the third length suture 50B may then be secured at a second end within the third through hole 40B by the third fibula button 52B.

As illustrated in FIG. 7C, the ankle syndesmosis repair system 10B further includes a second anchor 82B that can be secured within a second bone tunnel 100B that extends through the fibula 18 and partially into the tibia 54. In the illustrated embodiment, the second anchor 82B is secured within the tibia 54. When the ankle syndesmosis repair system 10B is implanted on the syndesmosis of the ankle, the second through hole 38B of the second bone tunnel 100B are coaxially arranged about a second longitudinal axis 94B. As illustrated, the second through hole 38B is arranged on an anterolateral side of the fibula 18.

The second bone tunnel 100B may be formed by a variety of tunnel forming devices. The second through hole 38B the second bone tunnel 100B are dimensioned such that the suture advancing device can pass through each of the second hole 38B and the second bone tunnel 100B. In use, the suture advancing device may be equipped with the second anchor 82B removably attached at a distal end and the second length of suture 46B secured to the second anchor 82B. The suture advancing device may then be moved through the second bone tunnel 100B until the second anchor 82B is located proximate to a tunnel end 101B within the second bone tunnel 100B.

The second anchor 82B may then be released from the suture advancing device and deployed to engage side walls of the second bone tunnel 100B. In other embodiments, the second anchor 82B may include one or more of barbs, threads, arms, etc. that provide a securing feature to secure the second anchor 82B within the second bone tunnel 100B. Following the securement of the second anchor 82B and the second length of suture 46B within the tibia 54, the second length suture 46B may then be secured at a second end within the second through hole 38B by the second fibula button 48B.

In the illustrated examples of FIGS. 7A-7C, each of the first, second, and third fibula buttons 45B, 48B, 52B have a concave inner surface configured to conform to the surface of the fibula bone plate 20B. However, in other embodiments, the first, second, and third fibula buttons 45B, 48B, 52B may each have a concave inner surface configured to conform to the fibula 18 directly. Further, as illustrated, the first through hole 36B and the second through hole 38B are axially spaced in relation to the fibula bone plate 20B. The third through hole 40B is arranged between the first through hole 36B and the second through hole 38B. Additionally, each of the anchors described above can have a longitudinal length exceeding a transverse distance from the posterolateral (or lateral, or anterolateral) surface of the fibula at the distal tibiofibular joint to the intraosseous anteromedial (or medial, or posteromedial) aspect of the tibia without exiting the medial surface of the tibia.

In some embodiments, suture anchors can form a bone tunnel extending from the lateral surface of the fibula at the distal tibiofibular joint to the intraosseous aspect of the tibia. When the suture anchor is moved through the distal fibula and the lateral cortex of the distal tibia, the bone tunnels can have substantially the same diameter as the statures. For example, the diameters of the bone tunnels may being approximately within the range of 0.5 millimeters to 2.5 millimeters, It should be appreciated that, while in the non-limiting illustrated example shown in FIGS. 7A-7C, there are three through holes 36B, 38B, 40B, in some other non-limiting examples, the fibula bone plate 20B may include more or less than three through holes. Further, with reference to the ankle syndesmosis repair system 10B illustrated in FIGS. 7A-7C, it should be understood that any of the forming of the first, second, and third bone tunnels 98B, 100B, 102B and the securement of the first, second, and third lengths of sutures 42B, 46B, 50B can occur in any order, and that the order described above is by way of example.

In general, the ankle syndesmosis repair system 10B provides a suture anchor device that has the ability to be placed parallel to the anterior inferior tibiofibular ligament or posterior inferior tibiofibular ligament. Use of such a suture anchor device prevents exposure devices on the medial cortex of the distal tibia. This can reduce the chance of skin irritation, device loosening, or risk of device dispositioning. Additionally, in general, the bone tunnel diameters required for the ankle syndesmosis repair system 10B can be substantially the same size as the suture or suture anchor, thereby increases the stability of the fixation construction.

Some embodiments of the invention include a pair of suture anchors, such as suture anchors 80B and 82B, and a pair of first and second length sutures, such as sutures 42B and 46B, extending through a single fibula button, such as the fibula button 48B. This configuration allows the pair of first and second suture anchors to be fired through a single plate hole, such as through hole 36B. As illustrated in FIGS. 7A-7C, the suture lengths are anchored at a middle section of the suture and two ends extend from each of the first, second, and third fibula buttons 45B, 48B, 52B. However, in other embodiments, the pair of suture anchors may be secured to a single end of the pair of first and second suture lengths, similar to the arrangement described below with reference to FIG. 7D.

Figure 7D:
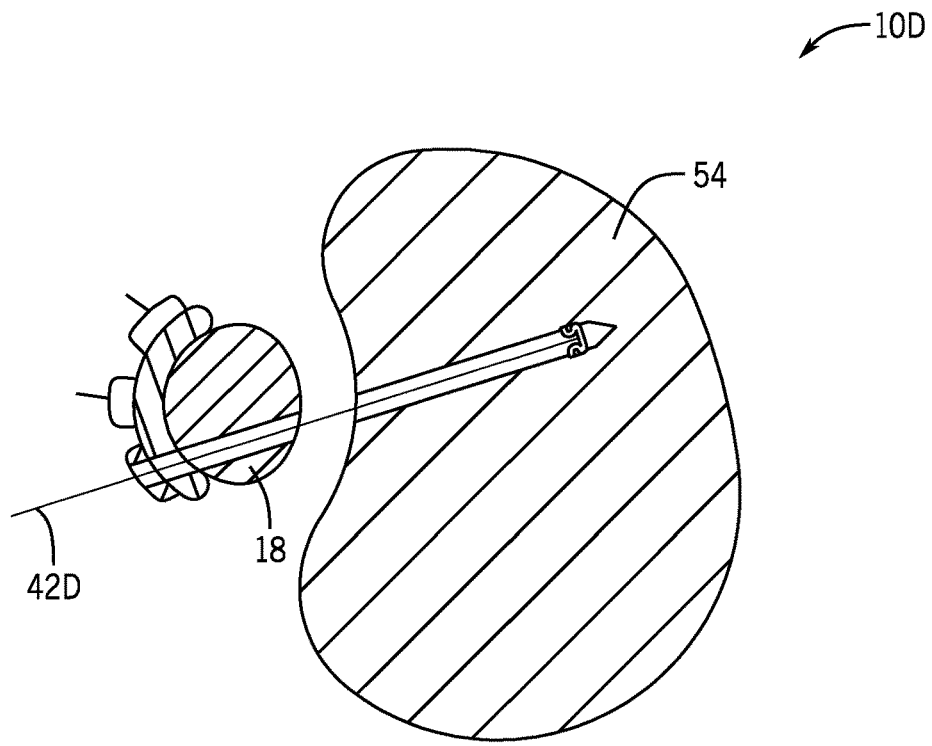
FIG. 7D is a cross-sectional view, similar to FIG. 7B, of another ankle syndesmosis repair system in accordance with the invention.

Referring now to FIG. 7D, an ankle syndesmosis repair system 10D is illustrated. The ankle syndesmosis repair system 10D is substantially similar to the ankle syndesmosis repair system 10B described above; however, a first length suture 42D extends from a first end at the lateral side of the fibula 18 to an anteromedial portion of the tibia 54. Additional details of the ankle syndesmosis repair system 10D will be avoided to avoid repetition. It should be appreciated, however, that additional bone tunnel configurations as illustrated in FIGS. 7A-7C can be applied to the ankle syndesmosis repair system 10D, though not shown.

Figure 8:
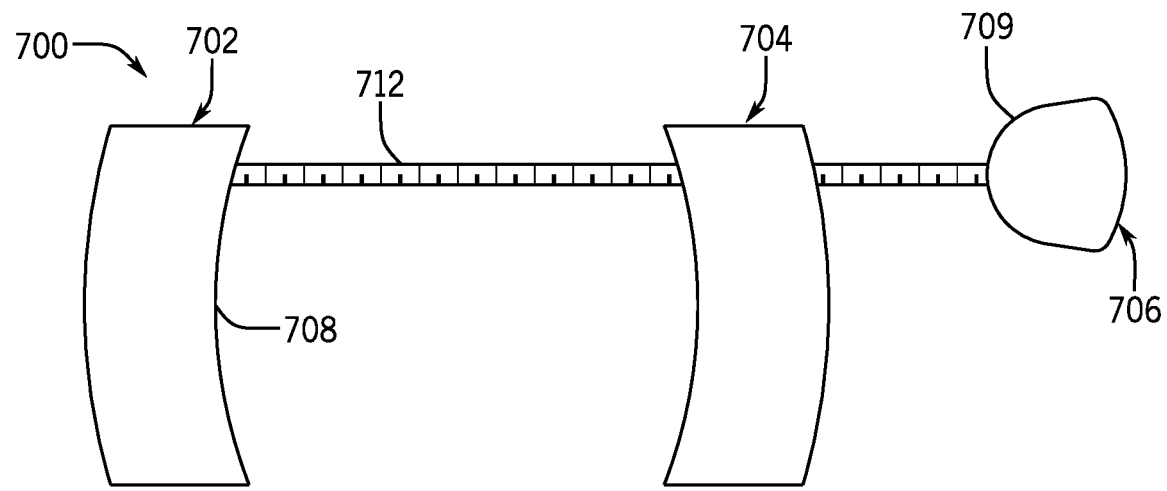
FIG. 8 is a plan view of a bone reduction clamp for use with the ankle syndesmosis repair system of FIG. 1.
Figure 9:
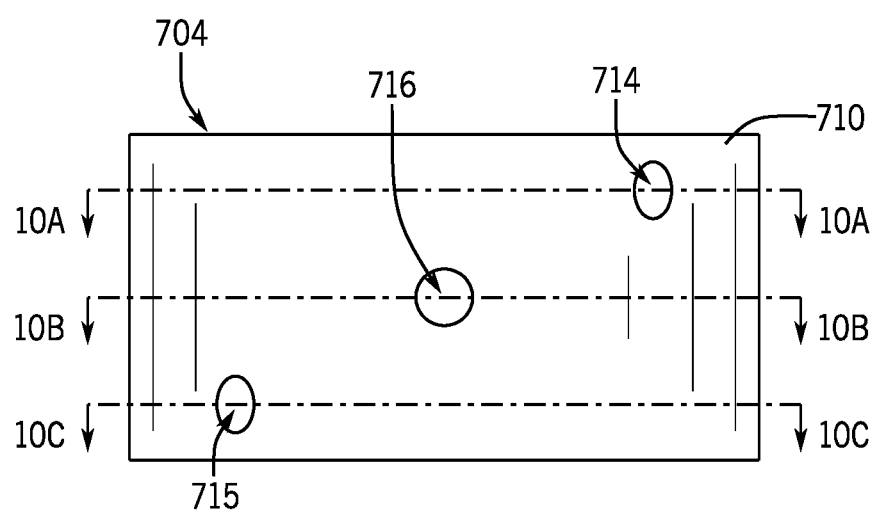
FIG. 9 is a right elevational view of a guide of the bone reduction clamp of FIG. 8.

Referring now to FIG. 8, a bone reduction clamp 700 configured for use with the ankle syndesmosis repair system 10 is shown. The bone reduction clamp 700 includes a first arm 702, a second arm 704, and an adjustment mechanism 706.

The first arm 702 includes a concave inner surface 708 configured to conform to one of the lateral surface of the fibula 18 or the medial surface of the tibia 54. The second arm 704 is arranged opposite the first arm 702 and similarly includes a concave inner surface 708 configured to conform to one of the lateral surface of the fibula 18 or the medial surface of the tibia 54.

The adjustment mechanism 706 is configured to move the second arm 704 toward or away from the first arm 702. The adjustment mechanism 706 includes a position adjustor 709 that may be rotatable with respect to the first arm 702. The position adjustor 709 may have an externally threaded post 712 that engages an internally threaded hole of the second arm 704 to translate the second arm 704 relative to the first arm 702. For example, rotation of the position adjustor 709 in a first direction may move the second arm 704 toward the first arm 702. Additionally, rotation of the position adjustor 709 in a second direction may move the second arm 704 away from the first arm 702.

In some instances, the position adjustor 709 may alternatively be rotatable with respect to the second arm 704. In these instances, the externally threaded post 712 may alternatively engage an internally threaded hole of the first arm 702 to translate the first arm 702 relative to the second arm 704. For example, rotation of the position adjustor 709 in a first direction may move the first arm 702 toward the second arm 704. Additionally, rotation of the position adjustor 709 in a second direction may move the first arm 702 away from the second arm 704.

In the illustrated non-limiting example, the second arm 704 further includes a guide 710 configured to guide a bone piercing tool, such as the suture advancing device 80. In some other examples, the first arm 702 can alternatively include the guide 710. The guide 710 has a first guide hole 714, a second guide hole 715, and a third guide hole 716.

Figure 10A:
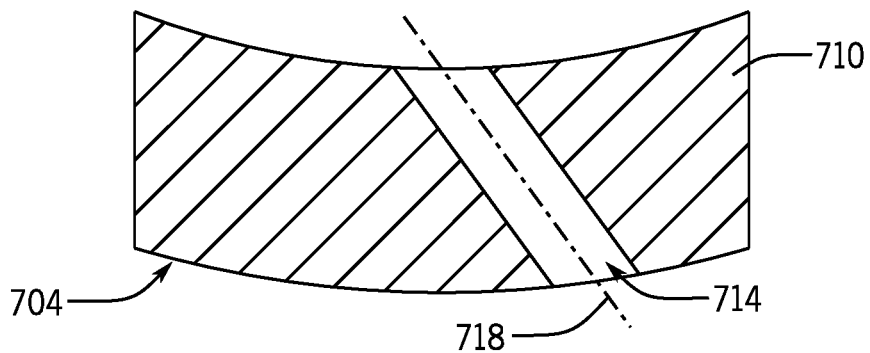
FIG. 10A is a cross-sectional view of the guide of FIG. 9, taken along line 10A-10A of FIG. 9.
Figure 10B:
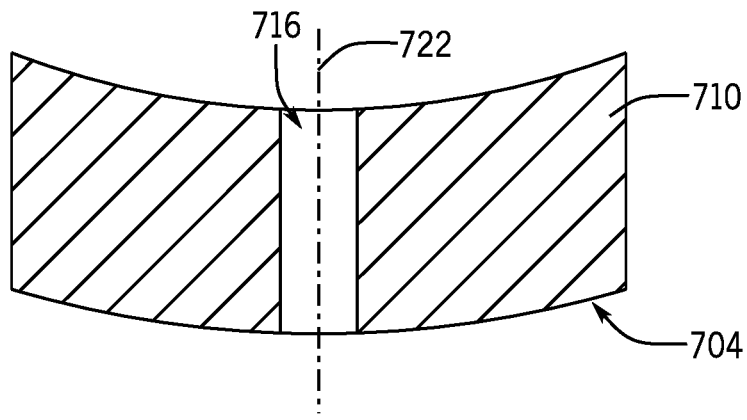
FIG. 10B is a cross-sectional view of the guide of FIG. 9, taken along line 10B-10B of FIG. 9.
Figure 10C:
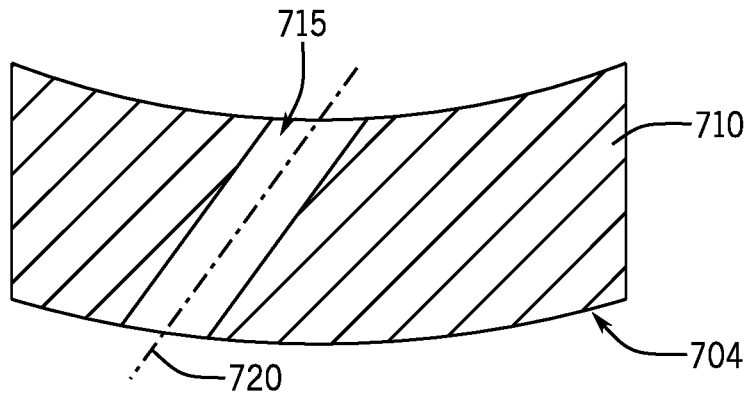
FIG. 10C is a cross-sectional view of the guide of FIG. 9, taken along line 10C-10C of FIG. 9.

Referring now to FIGS. 10A-10C, the first guide hole 714 has a first longitudinal axis 718 (shown in FIG. 10A), the second guide hole 715 has a second longitudinal axis 720 (shown in FIG. 10C), and the third guide hole 716 has a third longitudinal axis 722 (shown in FIG. 10B).

The first longitudinal axis 718 and the second longitudinal axis 720 are angled with respect with each other. Accordingly, the suture advancing device 80, or any other suitable bone piercing tool, is guided along a first path when being passed through the first guide hole 714 and along a second path when being passed through the second guide hole 715. The first path and the second path are at an oblique angle.

Further, the third longitudinal axis 722 is arranged between the first longitudinal axis 718 and the second longitudinal axis 720, such that the third longitudinal axis 722 is angled with respect to each of the first longitudinal axis 718 and the second longitudinal axis 720. Accordingly, the suture advancing device 80, or any other suitable bone piercing tool, is guided along a third path when being passed through the third guide hole 716, and the third path is at an oblique angle with respect to each of the first path and the second path.

As such, in some instances, the bone reduction clamp 700 may be configured to clamp the fibula 18 and the tibia 54 in a desired orientation, and to subsequently guide the suture advancing device 80 to create various bone tunnels, while avoiding various neurovascular elements in the ankle syndesmosis.

Now that the general structure of the ankle syndesmosis repair system 10 and the bone reduction clamp 700 have been described above, an exemplary method of use will be described below. It should be appreciated that the following method of use is provided as an example, and is in no way meant to be limiting.

During use, a surgeon may implant the ankle syndesmosis repair system 10 to fix the syndesmosis of the ankle. The surgeon may first fix the fibula engaging arrangement 12 onto the lateral side of the fibula 18 by screwing the bone screws 30, 34, through the bone screw apertures 28, 32 of the upper and lower screw receiving portions 22, 24 of the fibula bone plate 20. The surgeon may then use the suture advancing device 80, having the first length of suture 42 received therein and extending through the aperture at the proximal end 88, to create the first bone tunnel 98 through the fibula 18 and the tibia 54. A powered driver may be used to advance the suture advancing device 80. Once the first bone tunnel 98 is created, the suture advancing device 80 can be advanced until the aperture at the proximal end 88 is adjacent the outer surface of the fibula 18. The surgeon may then pull the suture advancing device 80 completely through the first bone tunnel 98.

The surgeon may then secure the first length of suture 42 within the first bone tunnel 98 using the first fibula button 45 and the first tibia button 66. Specifically, the surgeon may thread a first section of the first length of suture 42 through the first fibula button 45 and tie a knot in the first section of the first length of suture 42 to prevent the first length of suture 42 from backing out of or being pulled through the first fibula button 45. The surgeon may then thread a second section of the first length of suture 42 through the first passageway 60 of the tibia bone plate 56 and first tibia button 66 and tie a knot in the second section of the first length of suture 42 to prevent the second section of the first length of suture 42 from backing out of or being pulled through the first tibia button 66.

The surgeon may then similarly secure the second and third lengths of suture 46, 50 within the second and third bone tunnels 100, 102 using the second and third fibula buttons 48, 52 and the second and third tibia buttons 68, 70, as described above with reference to securing the first length of suture 42 within the first bone tunnel 98. As described above, in some instances, the tibia buttons 66, 68, 70 can be used to secure the lengths of suture 42, 46, 50 within the bone tunnels 98, 100, 102 without the tibia bone plate 56, with the tibia buttons 66, 68, 70 directly contacting the tibia 54.

As described above, the first bone tunnel 98 and the second bone tunnel 100 are angled with respect to each other in the axial view of the fibula 18 or the tibia 54. Accordingly, the suture advancing device 80 is guided along a first path when creating the first bone tunnel 98 and a second path when creating the second bone tunnel 100, the first path and the second path being at an oblique angle in the axial view of the fibula 18 or the tibia 54.

Further, the third bone tunnel 102 is arranged between the first bone tunnel 98 and the second bone tunnel 100, such that the third bone tunnel 102 is at an angle with respect to each of the first bone tunnel 98 and the second bone tunnel 100 in the axial view of the fibula 18 or the tibia 54. As such, the suture advancing device 80 is guided along a third path when creating the third bone tunnel 102, and the third path is at an oblique angle with respect to each of the first path and the second path in the axial view of the fibula 18 or the tibia 54.

Accordingly, when the fibula engaging arrangement 12 and the tibia engaging arrangement 14 are implanted on the ankle, and the first, second, and third lengths of suture 42, 46, 50 are secured within their corresponding bone tunnels 98, 100, 102, the lengths of suture 42, 46, 50 are arranged at similar angles with respect to each other. For example, first length of suture 42 and the second length of suture 46 are at an oblique angle in the axial view of the fibula 18 or the tibia 54. Similarly, the third length of suture 50 is at an oblique angle with respect to each of the first length of suture 42 and the second length of suture 46 in the axial view of the fibula 18 or the tibia 54. Additionally, the lengths of suture 42, 46, 50 are spaced longitudinally along the length of the ankle joint. As such, the ankle syndesmosis repair system 10 provides multi-level, multi-directional stabilization of the ankle syndesmosis. Alternatively, the bone tunnel 98 and the bone tunnel 100 can be arranged at an angle to cross with respect to each other in a frontal view of the tibiofibular joint such that the fibula button 45 is connected with the first length of suture 42 to the tibia button 68 and the fibula button 48 is connected with the second length of suture 46 to the tibia button 66. In another alternative embodiment, the bone tunnels 98, 100, 102 can converge to a location adjacent the central passageway 264 of tibia bone plate 56A shown in FIG. 3A. The passageway 264 may have an inner wall defining a conical shape similar to inner wall 76w in FIG. 4C.

In some instances, the first, second, and/or third lengths of suture 42, 46, 50 may be a unitary piece of suture that is passed through each of the first, second, and third through holes 36, 38, 40 of the fibula bone plate 20, each of the bone tunnels 98, 100, 102, and each of the corresponding passageways 60, 62, 64 or buttons 66, 68, 70. The unitary piece of suture may then be tied off at each end of the unitary piece of suture to fix the ankle syndesmosis repair system 10 in a desired orientation. Optionally, the unitary piece of suture may be passed two or more times through each of the first, second, and third through holes 36, 38, 40 of the fibula bone plate 20, each of the bone tunnels 98, 100, 102, and each of the corresponding passageways 60, 62, 64 or buttons 66, 68, 70.

In some instances, the surgeon may use the bone reduction clamp 700 with the ankle syndesmosis repair system 10 to aid in the accurate creation of the bone tunnels 98, 100, 102. For example, during surgery, the surgeon may use the bone reduction clamp 700 to force the fibula and the tibia into a desired orientation prior to the creation of the bone tunnels 98. This may be done by arranging the fibula 18 and the tibia 54 between the first arm 702 and the second arm 704, and subsequently using the adjustment mechanism 706 to move the first arm 702 and the second arm 704 toward each other to clamp the fibula 18 and the tibia 54 in the desired orientation. As the first arm 702 and the second arm 704 come together, one of the first arm 702 and the second arm 704 applies pressure to the fibula 18 and the other of the first arm 702 and the second arm 704 applies pressure to the tibia 54, pushing the fibula 18 and the tibia 54 into the desired orientation.

Once the fibula 18 and the tibia 54 have been clamped in the desired orientation, the surgeon may then create the first, second, and third bone tunnels 98, 100, 102 by passing the suture advancing device 80 through each of the first, second, and third guide holes 714, 715, 716 of the guide 710. Accordingly, the first, second, and third guide holes 714, 715, 716 of the guide 710 may be aligned with each of the first, second, and third longitudinal axes 92, 94, 96 of the ankle syndesmosis repair system 10.

Figure 11A:
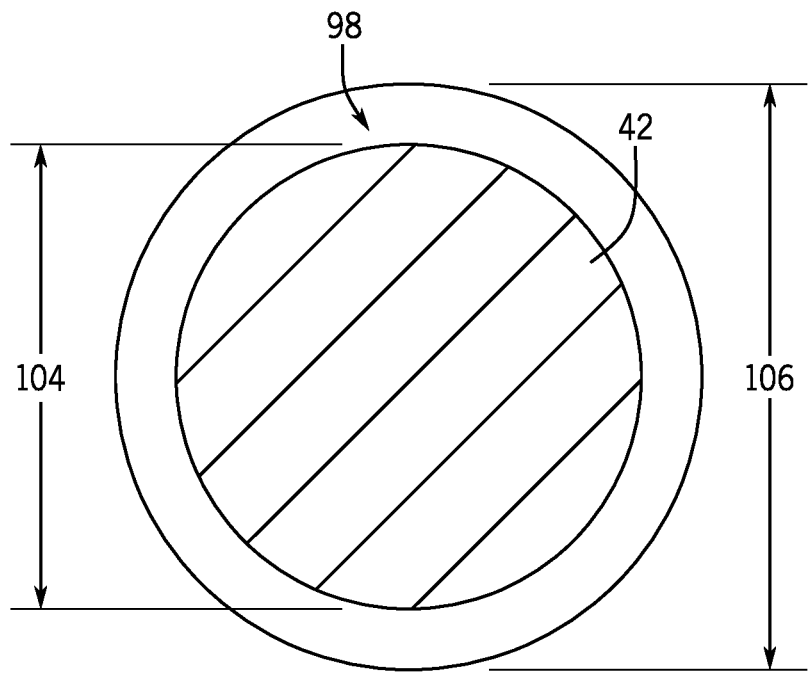
FIG. 11A shows a cross-sectional view of a length of suture arranged within a bone tunnel in accordance with the invention.

Referring now to FIG. 11A, the first length of suture 42 is shown within the first bone tunnel 98. As illustrated in this non-limiting embodiment, a diameter 104 of the first length of suture 42 can be approximately 0.5 to 0.7 millimeters which may be 70% to 97% of an inside diameter 106 of the first bone tunnel 98. However, the inside diameter of each of the first bone tunnels may be up to approximately 3.5 millimeters. Because the fibula buttons 45, 48, 52 and the tibia buttons 66, 68, 70 do not have to be passed through the various bone tunnels 98, 100, 102, the suture advancing device 80 can be sized accordingly, allowing for the outside diameters of the first, second, and third lengths of suture 42, 46, 50 to each be approximately 70% to 97% of the inside diameters of the corresponding bone tunnels 98, 100, 102. This ratio of outside diameter of the suture to the inside diameter of the corresponding bone tunnel provides a reduced amount of play in the ankle syndesmosis repair system 10 as compared to a system requiring clearance within the bone tunnels for passing a suture button.

Figure 11B:
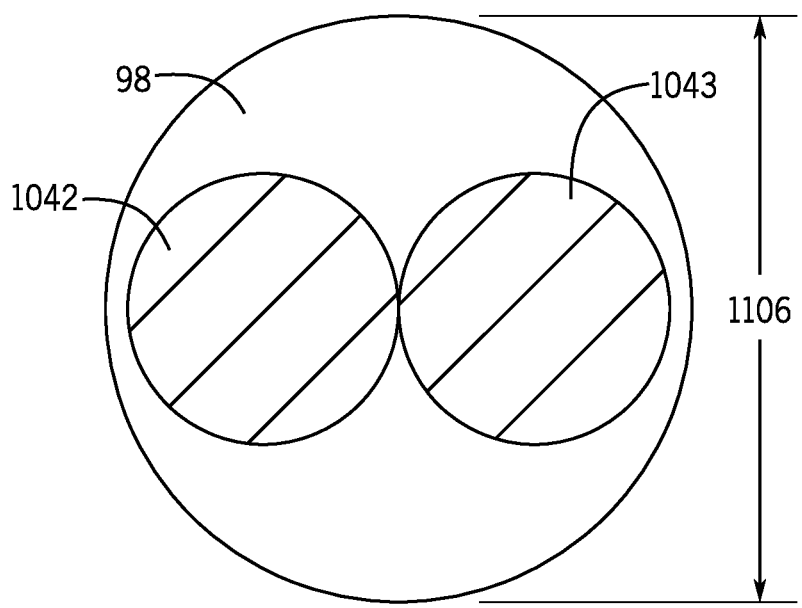
FIG. 11B shows a cross-sectional view of two lengths of suture arranged within a bone tunnel in accordance with the invention.

Referring now to FIG. 11B, a first length of suture 1042 and a second length of suture 1043 are shown within the first bone tunnel 98. As illustrated, the diameter of each of the first length of suture 1042 and the second length of suture 1043 is approximately 35% to 48% of a diameter 1106 of the first bone tunnel 98. This ratio of outside diameter of each of the pair of sutures to the inside diameter of the corresponding bone tunnel provides a reduced amount of play in the ankle syndesmosis repair system 10 as compared to a system requiring clearance within the bone tunnels for passing a suture button.

Figure 12:
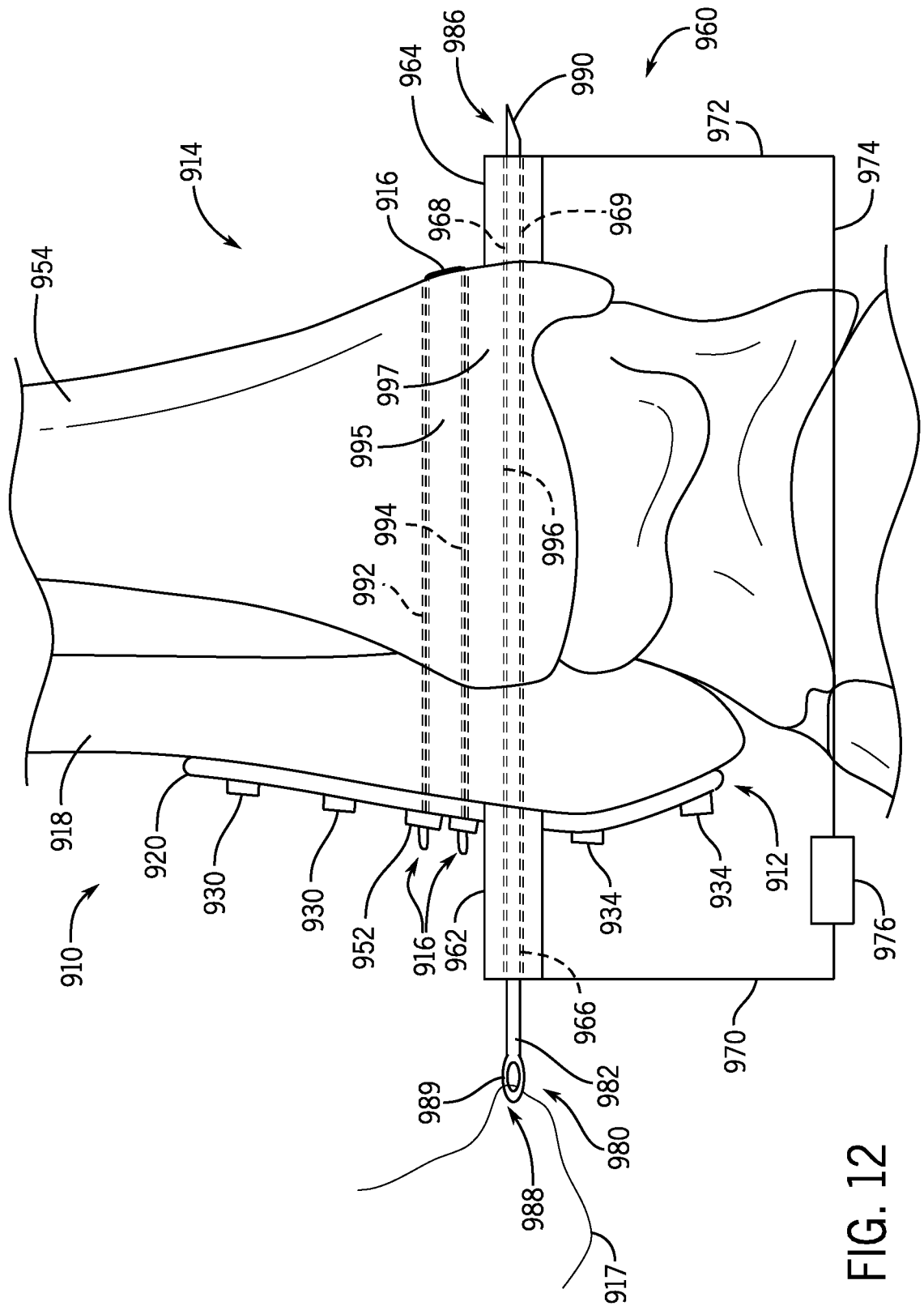
FIG. 12 shows a front elevational view of an ankle syndesmosis repair system and a jig mechanism for guiding a suture advancing device.

Referring now to FIG. 12, a jig mechanism 960 for guiding a suture advancing device 980 is shown. The jig mechanism 960 works as an assistant to an ankle syndesmosis repair system 910 for stabilizing the syndesmosis of an ankle. The system 910 includes a fibula engaging arrangement 912 and a tibia engaging region 914 coupled together by a first suture 916 and a second suture (not shown).

The fibula engaging arrangement 912 is dimensioned to engage a lateral surface of a fibula 918. For example, the fibula engaging arrangement 912 comprises a fibula bone plate 920 configured to conform to the lateral surface of the fibula 918. Additionally, the fibula bone plate 920 is configured to receive a plurality of bone screws 930, 934. The plurality of bone screws 930, 934 are configured to secure the fibula bone plate 920 to the fibula 918.

The suture advancing device 980 comprises an elongated shaft 982 extending along a longitudinal axis. The suture advancing device 980 may comprise, for example, a K-wire, or any other suitable suture advancing device. The suture advancing device 980 may comprise Nitinol or stainless steel. The suture advancing device 980 has a distal end 986 and a proximal end 988. The distal end 986 terminates in a pointed tip 990. The proximal end 988 includes an aperture 989 dimensioned to individually receive an end of a suture.

As illustrated, the suture advancing device 980 has a longitudinal length exceeding a transverse distance from an anteromedial surface of the tibia 954 to a posterolateral surface of the fibula 918 at the distal tibiofibular joint. As such, the suture advancing device 980 can form a bone tunnel extending from the posterolateral surface of the fibula 918 to the anteromedial surface of the tibia 954 when the suture advancing device 980 is moved through the fibula 918 and the tibia 954 at the distal tibiofibular joint.

In some non-limiting examples, the suture advancing device 980 may have a diameter in a range of 0.5 millimeters to 2.5 millimeters. For example, the suture advancing device 980 may have a diameter of approximately 1 millimeter. In some other non-limiting examples, the suture advancing device 980 may have a diameter in a range of 0.1 millimeters to 2.5 millimeters.

The jig mechanism 960 comprises a first tubular guide 962 and a second tubular guide 964. The first tubular guide 962 includes a first tubular passageway 966 configured to slidably receive the shaft 982 of the suture advancing device 980. The second tubular guide 964 includes a second tubular passageway 968 configured to slidably receive the shaft 982 of the suture advancing device 980. The second tubular guide 964 also includes a suture removal slot 969 configured remove a suture from the second tubular passageway 968. The first tubular guide 962 is attached to a first support 970 and the second tubular guide 964 is attached to a second support 972. The first support 970 and the second support 972 are attached via a support spacer 974, defining a distance between the first tubular guide 962 and the second tubular guide 964. The first tubular passageway 966 has a first longitudinal axis and the second tubular passageway 968 has a second longitudinal axis. The support spacer 974 is configured such that the first axis and the second axis can be aligned to be substantially collinear.

The support spacer 974 is configured to vary in length according to a jig adjuster 976. In one non-limiting example, the jig adjuster 976 may include a telescoping section of the support spacer 974 including threads, such that when the jig adjuster 976 is rotated in a first direction, the length of the support spacer 974 increases and when the jig adjuster 976 is rotated in a second direction, the length of the support spacer 974 decreases. As the support spacer 974 increases in length, the distance between the first tubular guide 962 and the second tubular guide 964 increases.

The first tubular passageway 966 and the second tubular passageway 968 are in alignment such that the suture advancing device 980 is compelled to travel along an intended axis when travelling between the first tubular guide 962 and the second tubular guide 964 while creating a bone tunnel. The suture advancing device 980 may have a diameter that is 80% of the diameter of the first tubular passageway 966 and the second tubular passageway 968 such that the suture advancing device 980 has restricted movement within the first tubular passageway 966 and the second tubular passageway 968. In another non-limiting example, the suture advancing device 980 may have a diameter that is 85%, 90%, or 95% of the diameter of the first tubular passageway 966 and the second tubular passageway 968.

The suture removal slot 969 may have a width such that a suture can pass through the suture removal slot 969 to be removed from the second tubular passageway 968 after the suture advancing device 980 has fully passed through the second tubular passageway 968. The width of the suture removal slot 969 may also be configured such that the suture advancing device 980 is unable to be removed from the second tubular passageway 968 when the suture advancing device 980 has partially passed through the second tubular passageway 968.

The surgeon may first fix the fibula bone plate 920 onto the lateral side of the fibula 918. The surgeon may then use the jig mechanism 960 to align the first tubular guide 962 with the lateral side of the fibula 918 and the second tubular guide 964 with the medial side of tibia the 954 by adjusting the length of the support spacer 974 via the jig adjuster 976. The jig adjuster 976 may be tightened such that a slight perturbation to the jig mechanism 960 will not affect the alignment of the first tubular guide 962 with the lateral side of the fibula 918 and the second tubular guide 964 with the medial side of the tibia 954. The surgeon may then insert the suture advancing device 980, equipped with a first suture 916 received through the aperture 989, into the first tubular passageway 966 and begin to form a first bone tunnel 992 extending from the posterolateral surface of the fibula 918 to the anteromedial surface of the tibia 954, such that the suture advancing device exits the tibia 954 and continues through the second tubular passageway 968 of the jig mechanism 960.

Once the first bone tunnel 992 is created, the jig mechanism 960 can be advanced via the jig adjuster 976 to shift the position of the first tubular guide 962 on the lateral side of the fibula 918 and the second tubular guide 964 on the medial side of the tibia 954 in preparation for a second bone tunnel 994, separated by a first bone bridge 995. The jig adjuster 976 may be again tightened such that a slight perturbation to the jig mechanism 960 will not affect the alignment of the first tubular guide 962 with the lateral side of the fibula 918 and the second tubular guide 964 with the medial side of the tibia 954. The suture advancing device 980 may be advanced and inserted into the second tubular passageway 968 and begin to form the second bone tunnel 994 extending from the anteromedial surface of the tibia 954 to the posterolateral surface of the fibula 918 such that the suture advancing device exits the fibula 918 and continues through the first tubular passageway 966 of the jig mechanism 960. Once the second bone tunnel 994 is created, the first suture 916 may be removed from the second tubular guide 964 via the suture removal slot 969. The surgeon may then temporarily remove the jig mechanism 960 and secure the first suture 916 under tension at opposite ends using a fibula button 952.

Once the second bone tunnel 994 is created, the surgeon may then use the jig mechanism 960 to align the first tubular guide 962 with the lateral side of the fibula 918 and the second tubular guide 964 with the medial side of tibia the 954 by adjusting the length of the support spacer 974 via the jig adjuster 976 in preparation for a third bone tunnel 996, separated by a second bone bridge 997. The jig adjuster 976 may be tightened such that a slight perturbation to the jig mechanism 960 will not affect the alignment of the first tubular guide 962 with the lateral side of the fibula 918 and the second tubular guide 964 with the medial side of the tibia 954. The surgeon may then insert the suture advancing device 980, equipped with a second suture 917 received through the aperture 989, into the first tubular passageway 966 and begin to form the third bone tunnel 996 extending from the posterolateral surface of the fibula 918 to the anteromedial surface of the tibia 954, such that the suture advancing device exits the tibia 954 and continues through the second tubular passageway 968 of the jig mechanism 960.

Once the third bone tunnel 996 is created, the jig mechanism 960 can be advanced via the jig adjuster 976 to shift the position of the first tubular guide 962 on the lateral side of the fibula 918 and the second tubular guide 964 on the medial side of the tibia 954 in preparation for a fourth bone tunnel (not shown), separated by a third bone bridge (not shown). The jig adjuster 976 may be again tightened such that a slight perturbation to the jig mechanism 960 will not affect the alignment of the first tubular guide 962 with the lateral side of the fibula 918 and the second tubular guide 964 with the medial side of the tibia 954. The suture advancing device 980 may be advanced and inserted into the second tubular passageway 968 and begin to form the fourth bone tunnel extending from the anteromedial surface of the tibia 954 to the posterolateral surface of the fibula 918 such that the suture advancing device exits the fibula 918 and continues through the first tubular passageway 966 of the jig mechanism 960. Once the fourth bone tunnel is created, the second suture 917 may be removed from the second tubular guide 964 via the suture removal slot 969. The surgeon may then remove the jig mechanism 960 and secure the second suture 917 under tension at opposite ends using a fibula button 952.

Thus, the invention provides systems and methods for treating and repairing ankle syndesmosis. More particularly, the invention provides a system for multi-level, multi angle stabilization of the ankle syndesmosis of a subject.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. An ankle syndesmosis repair system comprising:
   a first length of suture;
   a second length of suture;
   a suture advancing device comprising an elongated shaft having a distal end and a proximal end, the distal end terminating in a pointed tip, the proximal end being dimensioned to individually receive the first length of suture and the second length of suture;
   a fibula engaging arrangement dimensioned to engage a lateral surface of the fibula, the fibula engaging arrangement having a first through hole dimensioned to receive the first length of suture and a second through hole dimensioned to receive the second length of suture;
   a tibia engaging arrangement dimensioned to engage a medial surface of the tibia; the tibia engaging arrangement having a first passageway dimensioned to receive the first length of suture and a second passageway dimensioned to receive the second length of suture; and
   a third length of suture,
   wherein at least one of the fibula engaging arrangement and the tibia engaging arrangement is configured such that the first length of suture and the second length of suture are at an oblique angle in an axial view of the fibula or the tibia when the first length of suture, the second length of suture, the fibula engaging arrangement, and the tibia engaging arrangement are implanted in the ankle,
   wherein the proximal end of the suture advancing device is dimensioned to individually receive the third length of suture,
   wherein the fibula engaging arrangement has a third through hole dimensioned to receive the third length of suture,
   wherein the tibia engaging arrangement has a third passageway dimensioned to receive the third length of suture, and
   wherein at least one of the fibula engaging arrangement and the tibia engaging arrangement is configured such that the first length of suture and the third length of suture are at an oblique angle in the axial view of the fibula or the tibia when the first length of suture, the second length of suture, the third length of suture, the fibula engaging arrangement, and the tibia engaging arrangement are implanted in the ankle.

2. An ankle syndesmosis repair system comprising:
   a first length of suture;
   a second length of suture;
   a suture advancing device comprising an elongated shaft having a distal end and a proximal end, the distal end terminating in a pointed tip, the proximal end being dimensioned to individually receive the first length of suture and the second length of suture;

a fibula engaging arrangement dimensioned to engage a lateral surface of the fibula, the fibula engaging arrangement having a first through hole dimensioned to receive the first length of suture and a second through hole dimensioned to receive the second length of suture; and a tibia engaging arrangement dimensioned to engage a medial surface of the tibia; the tibia engaging arrangement having a first passageway dimensioned to receive the first length of suture and a second passageway dimensioned to receive the second length of suture;

wherein at least one of the fibula engaging arrangement and the tibia engaging arrangement is configured such that the first length of suture and the second length of suture are at an oblique angle in an axial view of the fibula or the tibia when the first length of suture, the second length of suture, the fibula engaging arrangement, and the tibia engaging arrangement are implanted in the ankle, wherein the fibula engaging arrangement comprises a fibula bone plate having the first through hole and the second through hole, wherein the first through hole and the second through hole being dimensioned such that the suture advancing device can pass through the first through hole and the second through hole, wherein the first through hole has a first longitudinal axis, wherein the second through hole has a second longitudinal axis, and wherein the first longitudinal axis and the second longitudinal axis are angled with respect to each other such that the suture advancing device is guided along a first path when passing through the first through hole and the suture advancing device is guided along a second path when passing through the second through hole, the first path and the second path being at an oblique angle in the axial view of the fibula or the tibia.

3. The ankle syndesmosis repair system of claim 2 wherein:
the first through hole and the second through hole are axially spaced in relation to a longitudinal axis of the fibula bone plate.

4. The ankle syndesmosis repair system of claim 2 wherein:
the fibula bone plate has a concave inner surface to conform to a surface of the fibula.

5. An ankle syndesmosis repair system comprising:
a first length of suture;
a second length of suture;
a suture advancing device comprising an elongated shaft having a distal end and a proximal end, the distal end terminating in a pointed tip, the proximal end being dimensioned to individually receive the first length of suture and the second length of suture;
a fibula engaging arrangement dimensioned to engage a lateral surface of the fibula, the fibula engaging arrangement having a first through hole dimensioned to receive the first length of suture and a second through hole dimensioned to receive the second length of suture; and
a tibia engaging arrangement dimensioned to engage a medial surface of the tibia; the tibia engaging arrangement having a first passageway dimensioned to receive the first length of suture and a second passageway dimensioned to receive the second length of suture,
wherein at least one of the fibula engaging arrangement and the tibia engaging arrangement is configured such that the first length of suture and the second length of suture are at an oblique angle in an axial view of the fibula or the tibia when the first length of suture, the second length of suture, the fibula engaging arrangement, and the tibia engaging arrangement are implanted in the ankle, and
wherein the elongated shaft of the suture advancing device is cylindrical and has a diameter in a range of 0.5 to 2.5 millimeters.

6. The ankle syndesmosis repair system of claim 5 wherein:
the fibula engaging arrangement comprises (i) a first fibula button having the first through hole and a first additional through hole, and (ii) a second fibula button having the second through hole and a second additional through hole.

7. The ankle syndesmosis repair system of claim 5 wherein:
the tibia engaging arrangement comprises (i) a first tibia button having the first passageway and a first additional passageway, and (ii) a second tibia button having the second passageway and a second additional passageway.

8. An ankle syndesmosis repair system comprising:
a first length of suture;
a second length of suture;
a suture advancing device comprising an elongated shaft having a distal end and a proximal end, the distal end terminating in a pointed tip, the proximal end being dimensioned to individually receive the first length of suture and the second length of suture;
a fibula engaging arrangement dimensioned to engage a lateral surface of the fibula, the fibula engaging arrangement having a first through hole dimensioned to receive the first length of suture and a second through hole dimensioned to receive the second length of suture; and
a tibia engaging arrangement dimensioned to engage a medial surface of the tibia; the tibia engaging arrangement having a first passageway dimensioned to receive the first length of suture and a second passageway dimensioned to receive the second length of suture;
wherein at least one of the fibula engaging arrangement and the tibia engaging arrangement is configured such that the first length of suture and the second length of suture are at an oblique angle in an axial view of the fibula or the tibia when the first length of suture, the second length of suture, the fibula engaging arrangement, and the tibia engaging arrangement are implanted in the ankle,
wherein the tibia engaging arrangement comprises a tibia bone plate having the first passageway and the second passageway,
wherein the first passageway and the second passageway being dimensioned such that the suture advancing device can pass through the first passageway and the second passageway,
wherein the first passageway has a first longitudinal axis,
wherein the second passageway has a second longitudinal axis, and
wherein the first longitudinal axis and the second longitudinal axis are angled with respect to each other such that the suture advancing device is guided along a first path when passing through the first passageway and the suture advancing device is guided along a second path when passing through the second passageway, the first path and the second path being at an oblique angle in the axial view of the fibula or the tibia.

9. An ankle syndesmosis repair system comprising:
a first length of suture;
a second length of suture;
a suture advancing device comprising an elongated shaft having a distal end and a proximal end, the distal end terminating in a pointed tip, the proximal end being dimensioned to individually receive the first length of suture and the second length of suture;
a fibula engaging arrangement dimensioned to engage a lateral surface of the fibula, the fibula engaging arrangement having a first through hole dimensioned to receive the first length of suture and a second through hole dimensioned to receive the second length of suture; and
a tibia engaging arrangement dimensioned to engage a medial surface of the tibia; the tibia engaging arrangement having a first passageway dimensioned to receive the first length of suture and a second passageway dimensioned to receive the second length of suture,
wherein at least one of the fibula engaging arrangement and the tibia engaging arrangement is configured such that the first length of suture and the second length of suture are at an oblique angle in an axial view of the fibula or the tibia when the first length of suture, the second length of suture, the fibula engaging arrangement, and the tibia engaging arrangement are implanted in the ankle,
wherein the ankle syndesmosis repair system further comprises a third length of suture,
wherein the proximal end of the suture advancing device is dimensioned to individually receive the third length of suture,
wherein the fibula engaging arrangement comprises a fibula bone plate having the first through hole and the second through hole and a third through hole,
wherein the first through hole and the second through hole and the third through hole being dimensioned such that the suture advancing device can pass through the first through hole and the second through hole and the third through hole,
wherein the first through hole has a first longitudinal axis,
wherein the second through hole has a second longitudinal axis,
wherein the third through hole has a third longitudinal axis,
wherein the first longitudinal axis and the second longitudinal axis are angled with respect to each other such that the suture advancing device is guided along a first path when passing through the first through hole and the suture advancing device is guided along a second path when passing through the second through hole, the first path and the second path being at an oblique angle in the axial view of the fibula or the tibia, and
wherein the tibia engaging arrangement comprises (i) a first tibia button having the first passageway and a first additional passageway, (ii) a second tibia button having the second passageway and a second additional passageway and (iii) a third tibia button having a third passageway and a third additional passageway.

* * * * *